US012647961B2

(12) United States Patent
Liu

(10) Patent No.: US 12,647,961 B2
(45) Date of Patent: Jun. 2, 2026

(54) METHOD AND APPARATUS FOR INDICATING NUMBER OF PUCCH TRANSMISSIONS, AND REPEAT TRANSMISSION METHOD AND APPARATUS

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 383 days.

(21) Appl. No.: 18/272,335

(22) PCT Filed: Jan. 14, 2021

(86) PCT No.: PCT/CN2021/071878
§ 371 (c)(1),
(2) Date: Jul. 13, 2023

(87) PCT Pub. No.: WO2022/151227
PCT Pub. Date: Jul. 21, 2022

(65) Prior Publication Data
US 2024/0073881 A1 Feb. 29, 2024

(51) Int. Cl.
*H04W 72/04* (2023.01)
*H04W 72/044* (2023.01)
(Continued)

(52) U.S. Cl.
CPC ......... *H04W 72/046* (2013.01); *H04W 72/21* (2023.01); *H04W 72/232* (2023.01); *H04W 76/20* (2018.02)

(58) Field of Classification Search
CPC . H04W 72/046; H04W 72/21; H04W 72/232; H04W 76/20; H04L 5/0094;
(Continued)

(56) References Cited

U.S. PATENT DOCUMENTS

| | | | |
|---|---|---|---|
| 2020/0029335 A1 | 1/2020 | Yang et al. | |
| 2022/0361164 A1* | 11/2022 | Li | H04L 5/0053 |
| 2023/0354274 A1* | 11/2023 | Shao | H04L 5/0078 |

FOREIGN PATENT DOCUMENTS

| | | |
|---|---|---|
| CN | 111988857 A | 11/2020 |

OTHER PUBLICATIONS

PCT/CN2021/071878, International Search Report dated Oct. 12, 2021, 2 pages.

* cited by examiner

*Primary Examiner* — Vinncelas Louis
(74) *Attorney, Agent, or Firm* — Cozen O'Connor

(57) ABSTRACT

A method for indicating a number of physical uplink control channel (PUCCH) transmissions. The method includes: determining a plurality of PUCCH resources indicated for the UE and supporting a joint and repeated transmission to a plurality of transmission and reception points (TRPs) of a base station; determining a first PUCCH resource from the plurality of PUCCH resources; receiving an indication signaling from the base station and determining, based on the indication signaling, a number of transmissions corresponding to a PUCCH transmission occasion for the joint and repeated transmission of the first PUCCH resource.

15 Claims, 5 Drawing Sheets determining a plurality of PUCCH resources indicated for the UE and supporting a joint and repeated transmission to a plurality of TRPs of a base station —101 determining a PUCCH target resource from the plurality of PUCCH resources —102 receiving an indication signaling of the base station, and determining a number of transmissions corresponding to a PUCCH transmission occasion for the joint and repeated transmission of the PUCCH target resource based on the indication signaling —103

(51) Int. Cl.

| | |
|---|---|
| *H04W 72/21* | (2023.01) |
| *H04W 72/232* | (2023.01) |
| *H04W 76/20* | (2018.01) |

(58) Field of Classification Search

CPC ... H04L 5/0023; H04L 5/0035; H04L 5/0053; H04L 5/0078

See application file for complete search history.

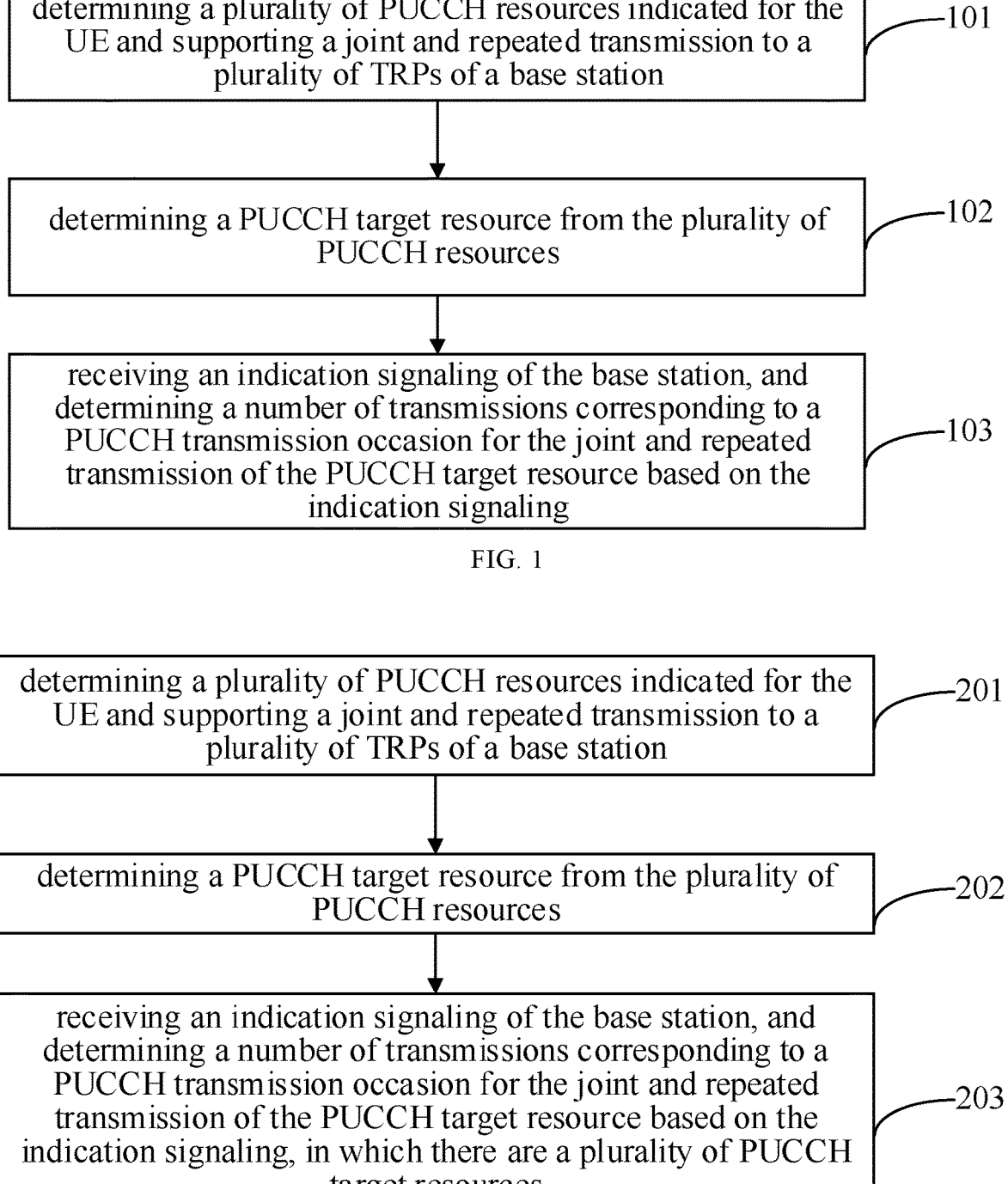

determining a plurality of PUCCH resources indicated for the UE and supporting a joint and repeated transmission to a plurality of TRPs of a base station ~101 determining a PUCCH target resource from the plurality of PUCCH resources ~102 receiving an indication signaling of the base station, and determining a number of transmissions corresponding to a PUCCH transmission occasion for the joint and repeated transmission of the PUCCH target resource based on the indication signaling ~103

FIG. 1 determining a plurality of PUCCH resources indicated for the UE and supporting a joint and repeated transmission to a plurality of TRPs of a base station ~201 determining a PUCCH target resource from the plurality of PUCCH resources ~202 receiving an indication signaling of the base station, and determining a number of transmissions corresponding to a PUCCH transmission occasion for the joint and repeated transmission of the PUCCH target resource based on the indication signaling, in which there are a plurality of PUCCH target resources ~203

FIG. 2

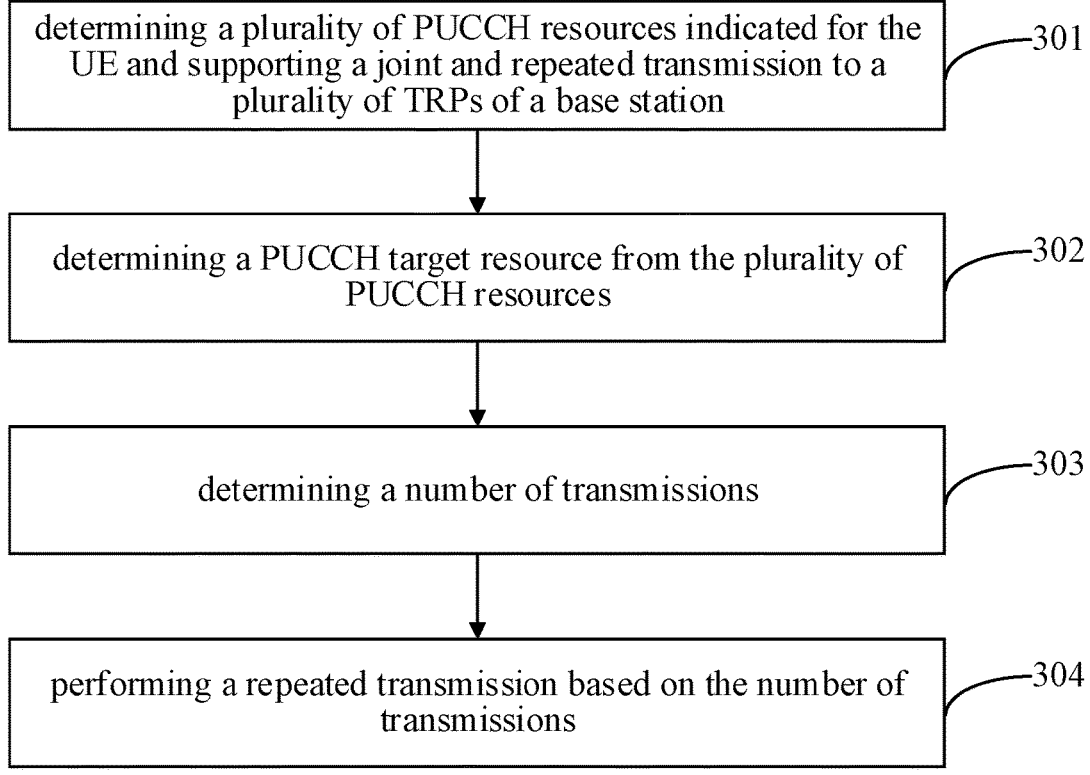

determining a plurality of PUCCH resources indicated for the UE and supporting a joint and repeated transmission to a plurality of TRPs of a base station ⌐301 determining a PUCCH target resource from the plurality of PUCCH resources ⌐302 determining a number of transmissions ⌐303 performing a repeated transmission based on the number of transmissions ⌐304

FIG. 3 sending an indication signaling to the UE, in which the indication signaling is configured to indicate a number of transmissions corresponding to a PUCCH transmission occasion for a joint and repeated transmission of a PUCCH target resource ⌐401

FIG. 4 sending an indication signaling to the UE, in which the indication signaling is configured to indicate a number of transmissions corresponding to a PUCCH transmission occasion for a joint and repeated transmission of a PUCCH target resource, there are a plurality of PUCCH target resources ⌐501

FIG. 5

METHOD AND APPARATUS FOR INDICATING NUMBER OF PUCCH TRANSMISSIONS, AND REPEAT TRANSMISSION METHOD AND APPARATUS

CROSS-REFERENCE TO RELATED APPLICATION

This application is a U.S. national phase of International Application No. PCT/CN2021/071878, filed with the State Intellectual Property Office of P. R. China on Jan. 14, 2021, the content of which is incorporated herein by reference in its entirety.

TECHNICAL FIELD

The disclosure relates to a field of wireless communication technology, in particular to a method and apparatus for indicating a number of physical uplink control channel (PUCCH) transmissions, a user equipment (UE), a base station, and a storage medium.

BACKGROUND

In a new radio (NR) system, a mechanism of repeated transmission in multiple time slots is introduced for transmission of a PUCCH resource to ensure a coverage range and reliability of the transmission of the PUCCH resource. In the related art, the repeated transmission of the PUCCH resource can only support one PUCCH resource, and a number of transmissions needs to be configured according to a PUCCH format, so that the configuration of the number of transmissions for all PUCCH resources corresponding to the same PUCCH format must be the same, making resource configuration inflexible.

SUMMARY

A method and apparatus for indicating a number of PUCCH transmissions, a repeated transmission method and apparatus, a user equipment (UE), a base station and a storage medium are proposed in the disclosure.

The method for indicating a number of PUCCH transmissions proposed by a first aspect of embodiments of the present disclosure is performed by a UE, and includes: determining a plurality of PUCCH resources indicated for the UE, the plurality of PUCCH resources supporting a joint and repeated transmission to a plurality of transmission and reception points (TRPs) of a base station; determining a first PUCCH resource from the plurality of PUCCH resources; receiving an indication signaling from the base station and determining, based on the indication signaling, a number of transmissions corresponding to a transmission occasion for the joint and repeated transmission of the first PUCCH resource.

The method for indicating a number of PUCCH transmissions proposed by a second aspect of embodiments of the present disclosure is performed by a base station, and includes: sending an indication signaling to a UE, in which the indication signaling is configured to indicate a number of transmissions corresponding to a PUCCH transmission occasion for a joint and repeated transmission of a first PUCCH resource.

A user equipment proposed by a third aspect of embodiments of the present disclosure includes: a transceiver; a memory; and a processor, respectively connected to the transceiver and the memory, and configured to:

determine a plurality of PUCCH resources indicated for the UE, the plurality of PUCCH resources supporting a joint and repeated transmission to a plurality of TRPs of a base station;

determine a first PUCCH resource from the plurality of PUCCH resources;

receive an indication signaling from the base station; and determine, based on the indication signaling, a number of transmissions corresponding to a transmission occasion for the joint and repeated transmission of the first PUCCH resource.

A base station proposed by a fourth aspect of embodiments of the present disclosure includes: a transceiver; a memory; and a processor, respectively connected to the transceiver and the memory, and configured to:

send an indication signaling to a UE, in which the indication signaling is configured to indicate a number of transmissions corresponding to a PUCCH transmission occasion for a joint and repeated transmission of a first PUCCH resource.

Additional aspects and advantages of the present disclosure will be set forth in part in the following description, and in part will become obvious from the following description, or may be learned by practice of the disclosure.

BRIEF DESCRIPTION OF THE DRAWINGS

The above and/or additional aspects and advantages of the present disclosure will become apparent and more readily appreciated from the following descriptions made with reference to the accompanying drawings, in which:

FIG. 1 is a flowchart of a method for indicating a number of PUCCH transmissions provided by an embodiment of the present disclosure;

FIG. 2 is a flowchart of another method for indicating a number of PUCCH transmissions provided by an embodiment of the present disclosure;

FIG. 3 is a flowchart of a repeated transmission method provided by an embodiment of the present disclosure;

FIG. 4 is a flowchart of a further method for indicating a number of PUCCH transmissions provided by an embodiment of the present disclosure;

FIG. 5 is a flowchart of a yet method for indicating a number of PUCCH transmissions provided by an embodiment of the present disclosure;

DETAILED DESCRIPTION

Figure 6:
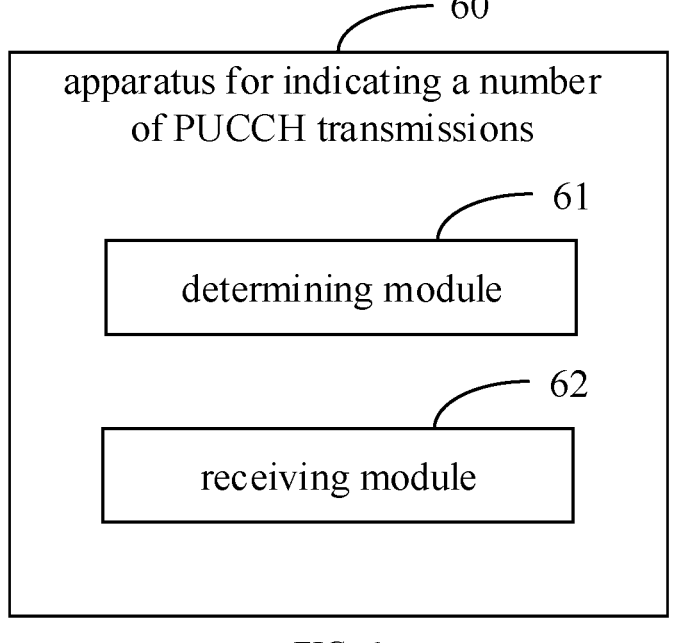
FIG. 6 is a block diagram of an apparatus for indicating a number of PUCCH transmissions provided by an embodiment of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit the disclosure. The singular forms of "a" and "the" used in the disclosure and appended claims are also intended to include plural forms, unless the context clearly indicates other meanings. It should also be understood that the term "and/or" as used herein refers to and includes any or all possible combinations of one or more associated listed items.

It should be understood that although the terms "first", "second", and "third" may be used in this disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the term "if" as used herein can be interpreted as "when", "while" or "in response to determining".

The following describes in detail the embodiments of the present application, examples of which are illustrated in the accompanying drawings. The same or similar reference numerals refer to the same or similar elements throughout. The embodiments described below with reference to the accompanying drawings are exemplary, and are intended to be used to explain the present application, but should not be construed as a limitation to the present disclosure.

In the related art, a repeated transmission of a PUCCH resource can only support one PUCCH resource, and a number of transmissions needs to be configured according to a PUCCH format, so that the configuration of the number of transmissions for all PUCCH resources corresponding to the same PUCCH format must be the same, making resource configuration inflexible. In the embodiment of the present application, for the problem in the related art, a method for indicating a number of PUCCH transmissions is proposed.

With the method for indicating a number of PUCCH transmissions provided by the embodiments of the present disclosure, a plurality of PUCCH resources indicated for the UE and supporting a joint and repeated transmission to a plurality of TRPs of a base station are determined, a PUCCH target resource is determined from the plurality of PUCCH resources, and a number of transmissions corresponding to a PUCCH transmission occasion for the joint and repeated transmission of the PUCCH target resource is determined based on the received indication signaling of the base station. Accordingly, the number of repeated transmissions of the PUCCH resource is flexibly set through the indication signaling of the base station, which improves a flexibility of resource configuration and realizes dynamic scheduling of resources.

The following describes in detail the method and apparatus for indicating a number of PUCCH transmissions, the repeated transmission method and apparatus, the UE, the base station, the storage medium, the computer program product and the computer program provided by the present disclosure with reference to the accompanying drawings.

FIG. 1 is a flowchart of a method for indicating a number of PUCCH transmissions provided by an embodiment of the present disclosure. The method is applied to a UE.

As shown in FIG. 1, the method for indicating a number PUCCH transmissions includes the following steps.

At step 101, a plurality of PUCCH resources indicated for the UE and supporting a joint and repeated transmission to a plurality of TRPs of a base station are determined.

In all the embodiments of the disclosure, the method can also be applied to a technical solution of joint transmission of a plurality of antenna panels. That is, step 101 may be determining a plurality of PUCCH resources indicated for the UE and supporting a joint and repeated transmission to a plurality of antenna panels of the base station.

In the embodiment of the present disclosure, the base station may include a plurality of TRPs, so that cooperation between the plurality of TRPs may be utilized to transmit or receive channels from a plurality of beams at a plurality of angles, so as to better overcome various occlusion and blocking effects and to ensure robustness of the link connection. Therefore, the UE can determine the number of TRPs in the base station according to a network configuration on the base station side, and determine the plurality of PUCCH resources indicated for the UE and supporting the joint and repeated transmission to the plurality of TRPs of the base station.

At step 102, a PUCCH target resource is determined from the plurality of PUCCH resources.

The PUCCH target resource may be a PUCCH resource for which a repeated transmission needs to be performed currently.

There is one PUCCH target resource, and the PUCCH target resource corresponds to at least one beam that supports the joint and repeated transmission to the plurality of TRPs of the base station.

As a possible implementation, the PUCCH target resource may be configured by the base station. That is, in a possible implementation of the embodiment of the present disclosure, the foregoing step 102 may include:

obtaining downlink control information (DCI); and determining the PUCCH target resource based on a field of PUCCH resource indication information included in the DCI.

In the embodiment of the present disclosure, the base station may configure the PUCCH target resource for which the repeated transmission needs to be performed through the DCI, and indicate the PUCCH target resource through the field of the PUCCH resource indication information included in the DCI, so that when the UE obtains the DCI sent by the base station, the UE determines the PUCCH resource corresponding to a value of the field as the PUCCH target resource according to the field of the PUCCH resource indication information included in the DCI.

At step 103, an indication signaling of the base station is received, and a number of transmissions corresponding to a PUCCH transmission occasion for the joint and repeated transmission of the PUCCH target resource is determined based on the indication signaling.

The indication signaling of the base station may be a radio resource control (RRC) signaling; correspondingly, the RRC signaling may include the corresponding number of transmissions configured for the PUCCH target resource.

As a possible implementation, the base station can flexibly and dynamically configure the number of repeated transmissions of the PUCCH target resource through a RRC signaling, so the UE can parse and process the RRC signaling when receiving the RRC signaling from the base station, so as to determine the number of repeated transmissions of the PUCCH target resource configured in the RRC signaling.

Further, in response to there being one PUCCH target resource and the PUCCH target resource corresponding to at least one beam direction, the base station may configure a candidate set of numbers of transmissions for a PUCCH resource or a PUCCH format, so that when the repeated transmission needs to be performed for the PUCCH resource, a corresponding number of transmissions is activated from the candidate set of numbers of transmissions as the number of transmissions of the PUCCH target resource. That is, in a possible implementation of the embodiment of the present disclosure, the foregoing step 103 may include:

> obtaining, from the RRC configuration information of the base station, candidate sets of numbers of transmissions configured respectively for a plurality of selectable PUCCH resource sets or a plurality of PUCCH formats; and
>
> receiving a medium access control control element (MAC CE) of the base station and determining, based on the MAC CE from a respective candidate set of numbers of transmissions, an activated number of transmissions or a combination of activated numbers of transmissions configured for one PUCCH resource set or one PUCCH format.

The activated number of transmissions is an activated number of transmissions supporting the joint and repeated transmission on the PUCCH to the plurality of TRPs of the base station, or the combination of activated numbers of transmissions is a combination of activated numbers of transmissions supporting the joint and repeated transmission on the PUCCH to the plurality of TRPs of the base station.

As a possible implementation, the base station may configure the candidate set of numbers of transmissions through the RRC signaling according to a type of PDCCH resources included in the selectable PDCCH resource set or the PDCCH format. The candidate set of numbers of transmissions may include multiple values (e.g., $\{k1, k2, \ldots, kn\}$) of numbers of transmissions. When the repeated transmission needs to be performed for the PDCCH resource, the base station can activate one or more numbers of transmissions for one PUCCH resource set or one PUCCH format from the candidate set of numbers of transmissions through the MAC CE, so as to generate the activated number of transmissions or the combination of activated numbers of transmissions. In addition, the activated number of transmissions or the combination of activated numbers of transmissions configured for one PUCCH resource set or one PUCCH format can be used for the joint and repeated transmission on the PUCCH to the plurality of TRPs of the base station of the PUCCH target resource.

It should be noted that, in response to the PUCCH target resource corresponding to one beam direction, one number of transmissions can be activated, that is, one activated number of transmissions is generated for one PUCCH resource set or one PUCCH format, so as to perform the repeated transmission through the one beam direction corresponding to the PUCCH target resource according to the activated number of transmissions. In response to the PUCCH target resource corresponding to a plurality of beam directions, the number of repeated transmissions of the PDCCH resource in each beam direction may be configured uniformly or independently according to the number of beam directions.

As a possible implementation, in response to there being a plurality of beam directions, the base station may uniformly configure the number of repeated transmissions of the PDCCH target resource in each beam direction through the MAC CE. That is, in a possible implementation of the embodiment of the present disclosure, in the above-mentioned candidate set of numbers of transmissions, the activated number of transmissions corresponding to the PUCCH resource is a first number of transmissions, in which the activated number of transmissions of the PUCCH resource on each beam is determined according to the first number of transmissions in a preset manner.

For example, in response to the number of beam directions being two and the preset manner referring to that "the activated number of transmissions of the PUCCH resource on each beam is a ratio of the first number of transmissions to the number of beam directions", the base station can configure the first number of transmissions as km from the candidate set of numbers of transmissions while activating two beam directions through the MAC CE, then it can determined that the activated number of transmissions of the PUCCH resource on one beam can be k1=floor(km/2), and the activated number of transmissions of the PUCCH resource on the other beam can be k2=km−k1.

As another possible implementation, in response to there being a plurality of beam directions, the base station may independently configure the number of repeated transmissions of the PDCCH target resource in each beam direction through the MAC CE. That is, in a possible implementation of the embodiment of the present disclosure, the above-mentioned activated number of transmissions or combination of activated numbers of transmissions includes a plurality of second numbers of transmissions, and each second number of transmissions corresponds to the number of transmissions on a transmission occasion of the PUCCH resource mapped from one beam direction.

For example, in response to there being two beam directions, the base station may configure two second numbers of transmissions as k1 and k2 from the candidate set of numbers of transmissions while activating two beam directions through the MAC CE. The second number k1 of transmissions corresponds to the number of transmissions on the transmission occasion of the PUCCH resource mapped from one beam direction, and the second number k2 of transmissions corresponds to the number of transmissions on the transmission occasion of the PUCCH resource mapped from the other beam direction. That is, the total number of transmissions may be K_total=k1+k2.

With the method for indicating a number of PUCCH transmissions provided by the embodiment of the present disclosure, a plurality of PUCCH resources indicated for the UE and supporting a joint and repeated transmission to a plurality of TRPs of a base station are determined, a PUCCH target resource is determined from the plurality of PUCCH resources, and a number of transmissions corresponding to a PUCCH transmission occasion for the joint and repeated transmission of the PUCCH target resource is determined based on the received indication signaling of the base station. Accordingly, the number of repeated transmissions of the PUCCH resource is flexibly set through the indication signaling of the base station, which improves a flexibility of resource configuration and realizes dynamic scheduling of resources.

The following further describes another method for indicating a number PUCCH transmissions provided by the embodiment of the present disclosure with reference to FIG. 2.

FIG. 2 is a flowchart of another method for indicating a number of PUCCH transmissions provided by an embodiment of the present disclosure. The method is applied to a UE.

As shown in FIG. 2, the method for indicating a number of PUCCH transmissions includes the following steps.

At step 201, a plurality of PUCCH resources indicated for the UE and supporting a joint and repeated transmission to a plurality of TRPs of a base station are determined.

In all the embodiments of the disclosure, the method can also be applied to a technical solution of joint transmission of a plurality of antenna panels. That is, step 201 may be determining a plurality of PUCCH resources indicated for the UE and supporting a joint and repeated transmission to a plurality of antenna panels of the base station.

At step 202, a PUCCH target resource is determined from the plurality of PUCCH resources.

In the embodiment of the present disclosure, steps 201 to 202 may be implemented in any manner described in the embodiments of the present disclosure, which are not limited in the embodiment of the present application, and will not be described again.

At step 203, an indication signaling of the base station is received, and a number of transmissions corresponding to a PUCCH transmission occasion for the joint and repeated transmission of the PUCCH target resource is determined based on the indication signaling. There are a plurality of PUCCH target resources.

As a possible implementation, in response to there being a plurality of PUCCH target resources, the base station may configure the number of transmissions of the plurality of PUCCH target resources through a RRC signaling according to a format of each resource in the PUCCH target resources. That is, in a possible implementation of the embodiment of the present disclosure, the above-mentioned indication signaling may be the RRC signaling. When the plurality of PUCCH target resources have the same transmission format, the RRC signaling includes a third number of transmissions, the third number of transmissions is configured to indicate the number of transmissions of the plurality of PUCCH target resources.

In the embodiment of the present disclosure, in response to the plurality of PUCCH target resources having the same transmission format, the base station may configure the third number of transmissions for the plurality of PUCCH target resources in the RRC signaling according to the transmission format of the PUCCH target resources, that is, the number of transmissions of each PUCCH target resource is configured as the third number of transmissions. Accordingly, in response to the plurality of PUCCH target resources having the same transmission format, the UE may, when receiving the RRC signaling sent by the base station, determine the third number of transmissions included in the RRC signaling, and determine the number of transmissions of each PUCCH target resource as the third number of transmissions. For example, the number of PUCCH target resources is 2, the third number of transmissions is k, and the total number of transmissions is K_total=2×k.

Correspondingly, in response to the plurality of PUCCH target resources having different transmission formats, the base station may configure a different number of transmissions for each PUCCH target resource according to the transmission formats of respective PUCCH target resources. That is, in a possible implementation of the embodiment of the present disclosure, the above-mentioned indication signaling may be a RRC signaling. When the plurality of PUCCH target resources have different transmission formats, the RRC signaling includes a plurality of fourth numbers of transmissions corresponding respectively to the plurality of PUCCH target resources.

In the embodiment of the present disclosure, in response to the plurality of PUCCH target resources having different transmission formats, the base station may configure fourth numbers of transmissions for the plurality of PUCCH target resources respectively in the RRC signaling according to the transmission formats of respective PUCCH target resources. That is, the fourth numbers of transmissions of respective PUCCH target resources may be different. Accordingly, in response to the plurality of PUCCH target resources having different transmission formats, the UE may, when receiving the RRC signaling sent by the base station, determine each fourth number of transmissions included in the RRC signaling, and determine each fourth number of transmissions as the number of transmissions of a respective PUCCH target resource. For example, the number of PUCCH target resources is 2, the two fourth numbers of transmissions are k1 and k2 respectively, and the total number of transmissions is K_total=k1+k2.

As a possible implementation, in response to there being a plurality of PUCCH target resources, the base station may further configure different numbers of transmissions for the plurality of PUCCH target resources respectively through the RRC signaling. That is, in a possible implementation of the embodiment of the present disclosure, the above-mentioned indication signaling is the RRC signaling. The RRC signaling includes a corresponding fifth number of transmissions configured for each PUCCH resource in the plurality of PUCCH target resources.

In the embodiment of the present disclosure, in response to there being a plurality of PUCCH target resources, the base station may further configure a different number of transmissions for each PUCCH target resource. Accordingly, in response to there being a plurality of PUCCH target resources, the UE may, when receiving the RRC signaling sent by the base station, determine each fifth number of transmissions included in the RRC signaling, and determine each fifth number of transmissions as the number of transmissions of a respective PUCCH target resource. For example, the number of PUCCH target resources is 2, the two fifth numbers of transmissions are k1 and k2 respectively, and the total number of transmissions is K_total=k1+k2.

Further, in response to there being a plurality of PUCCH target resources, the base station may configure a candidate set of numbers of transmissions for the PUCCH resource or PUCCH format, so as to activate a corresponding number of transmissions from the candidate set of numbers of transmissions as the number of transmissions of the PUCCH target resource when the repeated transmission needs to be performed for the PUCCH resource. That is, in a possible implementation of the embodiment of the present disclosure, the foregoing step 203 may include:

obtaining, from RRC configuration information of the base station, candidate sets of numbers of transmissions configured respectively for a plurality of selectable PUCCH resource sets or a plurality of PUCCH formats; and receiving a MAC CE of the base station and determining, based on the MAC CE from the candidate set of numbers of transmissions, an activated number of transmissions or a combination of activated numbers of transmissions configured for at least one PUCCH resource set or at least one PUCCH format; in which the activated number of transmissions is an activated number of transmissions supporting the joint and repeated transmission on the PUCCH to the plurality of TRPs of the base station, or the combination of activated numbers of transmissions is a combination of activated numbers of transmissions supporting the joint and repeated transmission on the PUCCH to the plurality of TRPs of the base station.

As a possible implementation, the base station may configure the candidate sets of numbers of transmissions for the plurality of selectable PUCCH resource sets or the plurality of PUCCHs respectively through the RRC signaling according to types of PUCCH resources included in the plurality of selectable PUCCH resource sets or the plurality of PUCCH formats. The candidate set of numbers of transmissions may include multiple values (e.g., {k1, k2, kn}) of numbers of transmissions. When the repeated transmission needs to be performed for the plurality of PUCCH resources, the base station can activate one or more numbers of transmissions for the plurality of PUCCH resource sets or the plurality of PUCCH formats from the respective candidate sets of numbers of transmissions through the MAC CE, so as to generate the activated number of transmissions or the combination of activated numbers of transmissions. In addition, the activated number of transmissions or the combination of activated numbers of transmissions configured for at least one PUCCH resource set or at least one PUCCH format can be used for the joint and repeated transmission on the PUCCH to the plurality of TRPs of the base station of the plurality of PUCCH target resources.

It should be noted that, in response to there being a plurality of PUCCH target resources and the PUCCH target resource corresponding to one beam direction, for each PUCCH target resource, one number of transmissions can be activated, that is, one activated number of transmissions is generated for one PUCCH resource set or one PUCCH format, so as to perform the repeated transmission through one beam direction corresponding to the PUCCH target resource according to the activated number of transmissions. In response to the PUCCH target resource corresponding to a plurality of beam directions, for each PDCCH target resource, the number of repeated transmissions of the PDCCH target resource can be configured uniformly or independently for each beam direction based on the number of beam directions.

As a possible implementation, in response to there being a plurality of beam directions, for each PDCCH target resource, the base station may uniformly configure the number of repeated transmissions of the PDCCH target resource for each beam direction through the MAC CE. That is, in a possible implementation of the embodiment of the present disclosure, in the above-mentioned candidate sets of numbers of transmissions, the activated number of transmissions corresponding to the PUCCH resource is a first number of transmissions, the activated number of transmissions of the PUCCH resource on each beam is determined based on the first number of transmissions in a preset manner.

For example, for a PUCCH target resource A, in response to there being two beam directions and the preset manner referring to that "the activated number of transmissions of the PUCCH resource on each beam is a ratio of the first number of transmissions to the number of beam directions", the base station can configure the first number of transmissions as km from the candidate set of numbers of transmissions for the PUCCH target resource A while activating two beam directions through the MAC CE, then it can determined that the activated number of transmissions of the PUCCH target resource A on one beam can be k1=floor(km/2), the activated number of transmissions of the PUCCH resource on the other beam can be k2=km−k1.

As another possible implementation, in response to there being a plurality of beam directions, for each PDCCH target resource, the base station may independently configure the number of repeated transmissions of the PDCCH target resource for each beam direction through the MAC CE. That is, in a possible implementation of the embodiment of the present disclosure, the above-mentioned activated number of transmissions or combination of activated numbers of transmissions includes a plurality of second numbers of transmissions, and each second number of transmissions indicates the number of transmissions on a transmission occasion corresponding to one PUCCH resource.

For example, for a PUCCH target resource A, in response to there being two beam directions, the base station can configure two second numbers of transmissions as k1 and k2 from the candidate set of numbers of transmissions corresponding to the PUCCH target resource A while activating two beam directions through the MAC CE. The second number k1 of transmissions corresponds to the number of transmissions on a transmission occasion of the PUCCH target resource A mapped from one beam direction, and the second number k2 of transmissions corresponds to the number of transmissions on a transmission occasion of the PUCCH target resource A mapped from the other beam direction. That is, the total number of transmissions may be K_total=k1+k2.

As a possible implementation, the base station may also configure an association relation table between a code point of PUCCH resource information and the PUCCH target resource through a RRC signaling, so as to configure a correspondence between the PUCCH resource and the number of transmissions through the association relation table. That is, in a possible implementation of the embodiment of the present disclosure, the above-mentioned indication signaling is the RRC signaling. The RRC signaling includes the association relation table between the code point of PUCCH resource information and the PUCCH target resource, and the association relation table includes a number of transmissions corresponding to a PUCCH repetition or the PUCCH target resource.

Optionally, in response to the association relation table including the number of transmissions corresponding to the PUCCH repetition, the current corresponding number of transmissions of each PUCCH target resource may be assigned in a preset manner according to the number of PUCCH target resources and the number of transmissions corresponding to the PUCCH repetition. For example, if the association relation table includes the number of transmissions k corresponding to the PUCCH repetition, the number of PUCCH target resources is 2, and the preset manner refers to "equally assigning the number of transmissions for each PUCCH target resource", then it can be determined that the number of transmissions of each PUCCH target resource is k/2.

Optionally, in response to the association relation table including the number of transmissions corresponding to the PUCCH target resource, the number of transmissions corresponding to each PUCCH target resource may be determined according to a code point corresponding to the PUCCH target resource.

Further, the base station may configure the code point of the PUCCH resource information through a DCI. That is, in a possible implementation of the embodiment of the present disclosure, the foregoing step 203 may include:

receive the DCI;

querying the association relation table according to a field containing the PUCCH resource information corresponding to the DCI to determine the number of transmissions.

In the embodiment of the present disclosure, the base station can configure the code point corresponding to the PDCCH target resource through the DCI, so that after obtaining the DCI sent by the base station, the UE can determine the code point of the PUCCH target resource according to the field of the PUCCH resource information included in the DCI, then query the association relation table according to the code point of the PUCCH target resource, and determine the number of transmissions corresponding to the code point of the PUCCH target resource as the number of transmissions corresponding to the PUCCH target resource.

Optionally, the association relation table may further include the total number of transmissions corresponding to the PUCCH target resource, that is, one DCI code point may correspond to one total number of transmissions. Accordingly, after obtaining the DCI sent by the base station, the UE can determine the code point corresponding to the total number of transmissions according to the field of the PUCCH resource information included in the DCI, and then query the association relation table according to the code point corresponding to the total number of transmissions to determine the total number of transmissions corresponding to the PUCCH target resource. Furthermore, according to the number of PUCCH target resources, the number of transmissions corresponding to each PUCCH target resource is assigned according to the total number of transmissions. For example, if the total number of transmissions is k and the number of PUCCH target resources is 2, the number of transmissions corresponding to one PUCCH target resource may be $k1=floor(k/2)$, and the number of transmissions corresponding to the other PUCCH target resource may be $k2=k-k1$.

With the method for indicating a number of PUCCH transmissions provided by the embodiment of the present disclosure, a plurality of PUCCH resources indicated for the UE and supporting a joint and repeated transmission to a plurality of TRPs of a base station are determined, a PUCCH target resource is determined from the plurality of PUCCH resources, and a number of transmissions corresponding to a PUCCH transmission occasion for the joint and repeated transmission of the plurality of PUCCH target resources is determined based on the received indication signaling of the base station. Accordingly, the number of repeated transmissions of the PUCCH resource is flexibly set through the indication signaling of the base station, which improves a flexibility of resource configuration and realizes dynamic scheduling of resources.

The following describes a repeated transmission method provided by an embodiment of the present disclosure with reference to FIG. 3.

FIG. 3 is a flowchart of a repeated transmission method provided by an embodiment of the present disclosure. The method is applied to a UE.

As shown in FIG. 3, the repeated transmission method includes the following steps.

At step 301, a plurality of PUCCH resources indicated for the UE and supporting a joint and repeated transmission to a plurality of TRPs of a base station are determined.

In all the embodiments of the disclosure, the method can also be applied to a technical solution of joint transmission of a plurality of antenna panels. That is, step 101 may be determining a plurality of PUCCH resources indicated for the UE and supporting a joint and repeated transmission to a plurality of antenna panels of the base station.

At step 302, a PUCCH target resource is determined from the plurality of PUCCH resources.

In the embodiment of the present disclosure, steps 301 to 302 may be implemented in any manner described in the embodiments of the present disclosure, which are not limited in the embodiment of the present application, and will not be described again.

At step 303, a number of transmissions is determined.

As a possible implementation, the number of transmissions of the PUCCH target resource may be determined according to the method for indicating a number of PUCCH transmissions described in any of the foregoing embodiments. For the specific implementation process and principle, reference can be made to the detailed description of the foregoing embodiments, which are not repeated here.

As another possible implementation, the base station and the UE may also determine the number of transmissions of the PUCCH target resource based on a protocol, or may also determine the number of transmissions of the PUCCH target resource based on a number of frequency hopping in a slot.

At step 304, a repeated transmission is performed based on the number of transmissions.

In the embodiment of the present disclosure, after the number of transmissions of the PUCCH target resource is determined, the repeated transmission may be performed on the PUCCH target resource according to the number of transmissions through a corresponding TRP at a corresponding transmission occasion.

With the repeated transmission method provided by the embodiment of the present disclosure, a plurality of PUCCH resources indicated for the UE and supporting a joint and repeated transmission to a plurality of TRPs of a base station are determined, a PUCCH target resource is determined from the plurality of PUCCH resources, the number of transmissions is determined, and the repeated transmission is performed based on the number of transmissions. Accordingly, the number of repeated transmissions of the PUCCH resource is flexibly set through the indication signaling of the base station, which improves a flexibility of resource configuration and realizes dynamic scheduling of resources.

The following further describes another method for indicating a number of PUCCH transmissions provided by an embodiment of the present disclosure with reference to FIG. 4.

FIG. 4 is a flowchart of another method for indicating a number of PUCCH transmissions provided by an embodiment of the present disclosure. The method is applied to a base station.

As shown in FIG. 4, the method for indicating a number of PUCCH transmissions includes the following steps.

At step 401, an indication signaling is sent to the UE. The indication signaling is configured to indicate a number of transmissions corresponding to a PUCCH transmission occasion for a joint and repeated transmission of a PUCCH target resource.

In all the embodiments of the disclosure, the method can also be applied to a technical solution of joint transmission of a plurality of antenna panels.

The PUCCH target resource may be a PUCCH resource for which a repeated transmission needs to be performed currently.

There is one PUCCH target resource, and the PUCCH target resource corresponds to at least one beam that supports the joint and repeated transmission to the plurality of TRPs of the base station.

As a possible implementation, the PUCCH target resource may be configured by a base station. That is, in a possible implementation of the embodiment of the present disclosure, the foregoing step 401 may include:

sending a DCI to the UE, so that the UE determines the PUCCH target resource based on a field of PUCCH resource indication information included in the DCI.

In the embodiment of the present disclosure, the base station may configure the PUCCH target resource for which the repeated transmission needs to be performed through the DCI, and indicate the PUCCH target resource through the field of PUCCH resource indication information included in the DCI. Accordingly, the base station can send the DCI to the UE, so that when the UE obtains the DCI sent by the base station, the UE may determine, based on the field of PUCCH resource indication information included in the DCI, the PUCCH resource corresponding to the value of the field as the PUCCH target resource.

The indication signaling of the base station may be a RRC signaling; correspondingly, the RRC signaling may include the corresponding number of transmissions configured for the PUCCH target resource.

As a possible implementation, the base station can flexibly and dynamically configure the number of repeated transmissions of the PUCCH target resource through the RRC signaling, and send it to the UE, so that the UE can parse and process the RRC signaling the RRC signal when receiving the RRC signaling from the base station, so as to determine the number of repeated transmissions of the PUCCH target resource configured in the RRC signaling.

Further, in response to there being one PUCCH target resource and the PUCCH target resource corresponding to at least one beam direction, the base station may configure a candidate set of numbers of transmissions for a PUCCH resource or a PUCCH format, so that when the repeated transmission needs to be performed for the PUCCH resource, a corresponding number of transmissions is activated from the candidate set of numbers of transmissions as the number of transmissions of the PUCCH target resource. That is, in a possible implementation of the embodiment of the present disclosure, the foregoing step 401 may include:

sending RRC configuration information of the base station to the UE, in which the RRC configuration information includes candidate sets of numbers of transmissions configured respectively for a plurality of selectable PUCCH resource sets or a plurality of PUCCH formats;

sending a MAC CE of the base station to the UE, and configuring an activated number of transmissions or a combination of activated numbers of transmissions for one PUCCH resource set or one PUCCH format in the MAC CE based on a respective candidate set of numbers of transmissions.

The activated number of transmissions is an activated number of transmissions supporting the joint and repeated transmission on the PUCCH to the plurality of TRPs of the base station, or the combination of activated numbers of transmissions is a combination of activated numbers of transmissions supporting the joint and repeated transmission on the PUCCH to the plurality of TRPs of the base station.

As a possible implementation, the base station may configure the candidate set of numbers of transmissions through the RRC signaling according to a type of PDCCH resources included in the selectable PDCCH resource set or the PDCCH format. The candidate set of numbers of transmissions may include multiple values (e.g., {k1, k2, . . . , kn}) of numbers of transmissions. When the repeated transmission needs to be performed for the PDCCH resource, the base station can activate one or more numbers of transmissions for one PUCCH resource set or one PUCCH format from the candidate set of numbers of transmissions through the MAC CE, so as to generate the activated number of transmissions or the combination of activated numbers of transmissions. In addition, the activated number of transmissions or the combination of activated numbers of transmissions configured for one PUCCH resource set or one PUCCH format can be used for the joint and repeated transmission on the PUCCH to the plurality of TRPs of the base station of the PUCCH target resource.

It should be noted that, in response to the PUCCH target resource corresponding to one beam direction, one number of transmissions can be activated, that is, one activated number of transmissions is generated for one PUCCH resource set or one PUCCH format, so as to perform the repeated transmission through the one beam direction corresponding to the PUCCH target resource according to the activated number of transmissions. In response to the PUCCH target resource corresponding to a plurality of beam directions, the number of repeated transmissions of the PDCCH resource in each beam direction may be configured uniformly or independently according to the number of beam directions.

As a possible implementation, in response to there being a plurality of beam directions, the base station may uniformly configure the number of repeated transmissions of the PDCCH target resource in each beam direction through the MAC CE. That is, in a possible implementation of the embodiment of the present disclosure, in the above-mentioned candidate set of numbers of transmissions, the activated number of transmissions corresponding to the PUCCH resource is a first number of transmissions, in which the activated number of transmissions of the PUCCH resource on each beam is determined according to the first number of transmissions in a preset manner.

For example, in response to the number of beam directions being two and the preset manner referring to that "the activated number of transmissions of the PUCCH resource on each beam is a ratio of the first number of transmissions to the number of beam directions", the base station can configure the first number of transmissions as km from the candidate set of numbers of transmissions while activating two beam directions through the MAC CE, then it can determined that the activated number of transmissions of the PUCCH resource on one beam can be $k1=\mathrm{floor}(km/2)$, and the activated number of transmissions of the PUCCH resource on the other beam can be $k2=km-k1$.

As another possible implementation, in response to there being a plurality of beam directions, the base station may independently configure the number of repeated transmissions of the PDCCH target resource in each beam direction through the MAC CE. That is, in a possible implementation of the embodiment of the present disclosure, the above-mentioned activated number of transmissions or combination of activated numbers of transmissions includes a plurality of second numbers of transmissions, and each second number of transmissions corresponds to the number of transmissions on a transmission occasion of the PUCCH resource mapped from one beam direction.

For example, in response to there being two beam directions, the base station may configure two second numbers of transmissions as k1 and k2 from the candidate set of numbers of transmissions while activating two beam directions through the MAC CE. The second number k1 of transmissions corresponds to the number of transmissions on the transmission occasion of the PUCCH resource mapped from one beam direction, and the second number k2 of transmissions corresponds to the number of transmissions on the transmission occasion of the PUCCH resource mapped from the other beam direction. That is, the total number of transmissions may be K_total=k1+k2.

With the method for indicating a number of PUCCH transmissions provided by the embodiment of the present disclosure, an indication signaling is sent by the base station to the UE. The indication signaling is configured to indicate a number of transmissions corresponding to a PUCCH transmission occasion for a joint and repeated transmission of the PUCCH target resource. Accordingly, the number of repeated transmissions of the PUCCH resource is flexibly set through the indication signaling of the base station, which improves a flexibility of resource configuration and realizes dynamic scheduling of resources.

The following further describes another method for indicating a number of PUCCH transmissions provided by an embodiment of the present disclosure with reference to FIG. 5.

FIG. 5 is a flowchart of another method for indicating a number of PUCCH transmissions provided by an embodiment of the present disclosure. The method is applied to a base station.

As shown in FIG. 5, the method for indicating a number of PUCCH transmissions includes the following steps.

At step 501, an indication signaling is sent to the UE. The indication signaling is configured to indicate a number of transmissions corresponding to a PUCCH transmission occasion for a joint and repeated transmission of a PUCCH target resource. There are a plurality of PUCCH target resources.

In all the embodiments of the disclosure, the method can also be applied to a technical solution of joint transmission of a plurality of antenna panels.

As a possible implementation, in response to there being a plurality of PUCCH target resources, the base station may configure the number of transmissions of the plurality of PUCCH target resources through a RRC signaling according to a format of each resource in the PUCCH target resources. That is, in a possible implementation of the embodiment of the present disclosure, the above-mentioned indication signaling may be the RRC signaling. When the plurality of PUCCH target resources have the same transmission format, the RRC signaling includes a third number of transmissions, the third number of transmissions is configured to indicate the number of transmissions of the plurality of PUCCH target resources.

In the embodiment of the present disclosure, in response to the plurality of PUCCH target resources having the same transmission format, the base station may configure the third number of transmissions for the plurality of PUCCH target resources in the RRC signaling according to the transmission format of the PUCCH target resources, that is, the number of transmissions of each PUCCH target resource is configured as the third number of transmissions. Accordingly, in response to the plurality of PUCCH target resources having the same transmission format, the base station may send the RRC signaling to the UE, so that the UE may, when receiving the RRC signaling sent by the base station, determine the third number of transmissions included in the RRC signaling, and determine the number of transmissions of each PUCCH target resource as the third number of transmissions. For example, the number of PUCCH target resources is 2, the third number of transmissions is k, and the total number of transmissions is K_total=2×k.

Correspondingly, in response to the plurality of PUCCH target resources having different transmission formats, the base station may configure a different number of transmissions for each PUCCH target resource according to the transmission formats of respective PUCCH target resources. That is, in a possible implementation of the embodiment of the present disclosure, the above-mentioned indication signaling may be a RRC signaling. When the plurality of PUCCH target resources have different transmission formats, the RRC signaling includes a plurality of fourth numbers of transmissions corresponding respectively to the plurality of PUCCH target resources.

In the embodiment of the present disclosure, in response to the plurality of PUCCH target resources having different transmission formats, the base station may configure fourth numbers of transmissions for the plurality of PUCCH target resources respectively in the RRC signaling according to the transmission formats of respective PUCCH target resources. That is, the fourth numbers of transmissions of respective PUCCH target resources may be different. Accordingly, in response to the plurality of PUCCH target resources having different transmission formats, the base station may send the RRC signaling to the UE, so that the UE may, when receiving the RRC signaling sent by the base station, determine each fourth number of transmissions included in the RRC signaling, and determine each fourth number of transmissions as the number of transmissions of a respective PUCCH target resource. For example, the number of PUCCH target resources is 2, the two fourth numbers of transmissions are k1 and k2 respectively, and the total number of transmissions is K_total=k1+k2.

As a possible implementation, in response to there being a plurality of PUCCH target resources, the base station may further configure different numbers of transmissions for the plurality of PUCCH target resources respectively through the RRC signaling. That is, in a possible implementation of the embodiment of the present disclosure, the above-mentioned indication signaling is the RRC signaling. The RRC signaling includes a corresponding fifth number of transmissions configured for each PUCCH resource in the plurality of PUCCH target resources.

In the embodiment of the present disclosure, in response to there being a plurality of PUCCH target resources, the base station may further configure a different number of transmissions for each PUCCH target resource. Accordingly, in response to there being a plurality of PUCCH target resources, the base station may send the RRC signaling to the UE, so that the UE may, when receiving the RRC signaling sent by the base station, determine each fifth number of transmissions included in the RRC signaling, and determine each fifth number of transmissions as the number of transmissions of a respective PUCCH target resource. For example, the number of PUCCH target resources is 2, the two fifth numbers of transmissions are k1 and k2 respectively, and the total number of transmissions is K_total=k1+k2.

Further, in response to there being a plurality of PUCCH target resources, the base station may configure a candidate set of numbers of transmissions for the PUCCH resource or PUCCH format, so as to activate a corresponding number of transmissions from the candidate set of numbers of transmissions as the number of transmissions of the PUCCH target resource when the repeated transmission needs to be performed for the PUCCH resource. That is, in a possible implementation of the embodiment of the present disclosure, the foregoing step 501 may include:

sending RRC configuration information of the base station to the UE, in which the RRC configuration information includes candidate sets of numbers of transmissions configured respectively for a plurality of selectable PUCCH resource sets or a plurality of PUCCH formats; and sending a MAC CE of the base station to the UE, and configuring an activated number of transmissions or a combination of activated numbers of transmissions for one PUCCH resource set or one PUCCH format in the MAC CE based on the candidate sets of numbers of transmissions.

The activated number of transmissions is an activated number of transmissions supporting the joint and repeated transmission on the PUCCH to the plurality of TRPs of the base station, or the combination of activated numbers of transmissions is a combination of activated numbers of transmissions supporting the joint and repeated transmission on the PUCCH to the plurality of TRPs of the base station.

As a possible implementation, the base station may configure the candidate sets of numbers of transmissions for the plurality of selectable PUCCH resource sets or the plurality of PUCCHs respectively through the RRC signaling according to types of PUCCH resources included in the plurality of selectable PUCCH resource sets or the plurality of PUCCH formats. The candidate set of numbers of transmissions may include multiple values (e.g., {k1, k2, kn}) of numbers of transmissions. When the repeated transmission needs to be performed for the plurality of PUCCH resources, the base station can activate one or more numbers of transmissions for the plurality of PUCCH resource sets or the plurality of PUCCH formats from the respective candidate sets of numbers of transmissions through the MAC CE, so as to generate the activated number of transmissions or the combination of activated numbers of transmissions. In addition, the activated number of transmissions or the combination of activated numbers of transmissions configured for at least one PUCCH resource set or at least one PUCCH format can be used for the joint and repeated transmission on the PUCCH to the plurality of TRPs of the base station of the plurality of PUCCH target resources.

It should be noted that, in response to there being a plurality of PUCCH target resources and the PUCCH target resource corresponding to one beam direction, for each PUCCH target resource, one number of transmissions can be activated, that is, one activated number of transmissions is generated for one PUCCH resource set or one PUCCH format, so as to perform the repeated transmission through one beam direction corresponding to the PUCCH target resource according to the activated number of transmissions. In response to the PUCCH target resource corresponding to a plurality of beam directions, for each PDCCH target resource, the number of repeated transmissions of the PDCCH target resource can be configured uniformly or independently for each beam direction based on the number of beam directions.

As a possible implementation, in response to there being a plurality of beam directions, for each PDCCH target resource, the base station may uniformly configure the number of repeated transmissions of the PDCCH target resource for each beam direction through the MAC CE. That is, in a possible implementation of the embodiment of the present disclosure, in the above-mentioned candidate sets of numbers of transmissions, the activated number of transmissions corresponding to the PUCCH resource is a first number of transmissions, the activated number of transmissions of the PUCCH resource on each beam is determined based on the first number of transmissions in a preset manner.

For example, for a PUCCH target resource A, in response to there being two beam directions and the preset manner referring to that "the activated number of transmissions of the PUCCH resource on each beam is a ratio of the first number of transmissions to the number of beam directions", the base station can configure the first number of transmissions as km from the candidate set of numbers of transmissions for the PUCCH target resource A while activating two beam directions through the MAC CE, then it can determined that the activated number of transmissions of the PUCCH target resource A on one beam can be k1=floor(km/2), the activated number of transmissions of the PUCCH resource on the other beam can be k2=km−k1.

As another possible implementation, in response to there being a plurality of beam directions, for each PDCCH target resource, the base station may independently configure the number of repeated transmissions of the PDCCH target resource for each beam direction through the MAC CE. That is, in a possible implementation of the embodiment of the present disclosure, the above-mentioned activated number of transmissions or combination of activated numbers of transmissions includes a plurality of second numbers of transmissions, and each second number of transmissions indicates the number of transmissions on a transmission occasion corresponding to one PUCCH resource.

For example, for a PUCCH target resource A, in response to there being two beam directions, the base station can configure two second numbers of transmissions as k1 and k2 from the candidate set of numbers of transmissions corresponding to the PUCCH target resource A while activating two beam directions through the MAC CE. The second number k1 of transmissions corresponds to the number of transmissions on a transmission occasion of the PUCCH target resource A mapped from one beam direction, and the second number k2 of transmissions corresponds to the number of transmissions on a transmission occasion of the PUCCH target resource A mapped from the other beam direction. That is, the total number of transmissions may be K_total=k1+k2.

As a possible implementation, the base station may also configure an association relation table between a code point of PUCCH resource information and the PUCCH target resource through a RRC signaling, so as to configure a correspondence between the PUCCH resource and the number of transmissions through the association relation table. That is, in a possible implementation of the embodiment of the present disclosure, the above-mentioned indication signaling is the RRC signaling. The RRC signaling includes the association relation table between the code point of PUCCH resource information and the PUCCH target resource, and the association relation table includes a number of transmissions corresponding to a PUCCH repetition or the PUCCH target resource.

Optionally, in response to the association relation table including the number of transmissions corresponding to the PUCCH repetition, the current corresponding number of transmissions of each PUCCH target resource may be assigned in a preset manner according to the number of PUCCH target resources and the number of transmissions corresponding to the PUCCH repetition. For example, if the association relation table includes the number of transmissions k corresponding to the PUCCH repetition, the number of PUCCH target resources is 2, and the preset manner refers to "equally assigning the number of transmissions for each PUCCH target resource", then it can be determined that the number of transmissions of each PUCCH target resource is k/2.

Optionally, in response to the association relation table including the number of transmissions corresponding to the PUCCH target resource, the base station may configure the code point of PUCCH resource information through the DCI, so that the base station may determine the number of transmissions corresponding to each PUCCH target resource according to the code point corresponding to the PUCCH target resource. That is, in a possible implementation of the embodiment of the present disclosure, the foregoing step 501 may include:

sending a DCI to the UE, in which the DCI contains a field of PUCCH resource information.

In the embodiment of the present disclosure, the base station can configure the code point corresponding to the PDCCH target resource through the DCI, and send the DCI to the UE, so that the UE can, after obtaining the DCI sent by the base station, determine the code point of the PUCCH target resource according to the field of the PUCCH resource information included in the DCI, then query the association relation table according to the code point of the PUCCH target resource, and determine the number of transmissions corresponding to the code point of the PUCCH target resource as the number of transmissions corresponding to the PUCCH target resource.

Optionally, the association relation table may further include the total number of transmissions corresponding to the PUCCH target resource, that is, one DCI code point may correspond to one total number of transmissions. Accordingly, the base station can configure the code point corresponding to the total number of transmissions through the DCI, and send the DCI to the UE, so that the UE can, after obtaining the DCI sent by the base station, determine the code point corresponding to the total number of transmissions according to the field of the PUCCH resource information included in the DCI, and then query the association relation table according to the code point corresponding to the total number of transmissions to determine the total number of transmissions corresponding to the PUCCH target resource. Furthermore, according to the number of PUCCH target resources, the number of transmissions corresponding to each PUCCH target resource is assigned according to the total number of transmissions. For example, if the total number of transmissions is k and the number of PUCCH target resources is 2, the number of transmissions corresponding to one PUCCH target resource may be k1=floor(k/2), and the number of transmissions corresponding to the other PUCCH target resource may be k2=k-k1.

With the method for indicating a number of PUCCH transmissions provided by the embodiment of the present disclosure, the base station sends an indication signaling to the UE, in which the indication signaling is configured to indicate the number of transmissions corresponding to a PUCCH transmission occasion for a joint and repeated transmission of a PUCCH target resource. There are a plurality of PUCCH target resources. Accordingly, the number of repeated transmissions of the PUCCH resource is flexibly set through the indication signaling of the base station, which improves a flexibility of resource configuration and realizes dynamic scheduling of resources.

In order to implement the above embodiments, the present disclosure also proposes an apparatus for indicating a number of PUCCH transmissions.

FIG. 6 is a block diagram of an apparatus for indicating a number of PUCCH transmissions provided by an embodiment of the present disclosure. The apparatus is applied to a UE.

As shown in FIG. 6, the apparatus 60 includes a determining module 61 and a receiving module 62.

The determining module 61 is configured to determine a plurality of PUCCH resources indicated for the UE and supporting a joint and repeated transmission to a plurality of transmission and reception points (TRPs) of a base station.

The determining module 61 is further configured to determine a PUCCH target resource from the plurality of PUCCH resources.

The receiving module 62 is configured to receive an indication signaling of the base station, and determine, based on the indication signaling, a number of transmissions corresponding to a PUCCH transmission occasion for the joint and repeated transmission of the PUCCH target resource.

In actual use, the apparatus for indicating a number of PUCCH transmissions provided by the embodiment of the present disclosure may be configured in any UE to perform the foregoing method for indicating a number of PUCCH transmissions.

With the apparatus for indicating a number of PUCCH transmissions provided by the embodiment of the present disclosure, a plurality of PUCCH resources indicated for the UE and supporting a joint and repeated transmission to a plurality of TRPs of a base station are determined, a PUCCH target resource is determined from the plurality of PUCCH resources, and a number of transmissions corresponding to a PUCCH transmission occasion for the joint and repeated transmission of the PUCCH target resource is determined based on the received indication signaling of the base station. Accordingly, the number of repeated transmissions of the PUCCH resource is flexibly set through the indication signaling of the base station, which improves a flexibility of resource configuration and realizes dynamic scheduling of resources.

In a possible implementation of the present disclosure, there is one PUCCH target resource, and the PUCCH target resource corresponds to at least one beam that supports the joint and repeated transmission to the plurality of TRPs of the base station, and the indication signaling is a radio resource control (RRC) signaling, and the RRC signaling includes a number of transmissions configured for the PUCCH target resource.

Further, in another possible implementation of the present disclosure, the above determining module 61 is further configured to:

obtain downlink control information (DCI);

determine the PUCCH target resource based on a field of PUCCH resource indication information contained in the DCI.

Further, in another possible implementation of the present disclosure, there is one PUCCH target resource, and the PUCCH target resource corresponds to at least one beam direction, and the above-mentioned receiving module 62 is specifically configured to:

obtain, from RRC configuration information of the base station, candidate sets of numbers of transmissions configured respectively for a plurality of selectable PUCCH resource sets or a plurality of PUCCH formats; and receive a medium access control control element (MAC CE) of the base station and determine, based on the MAC CE, from the candidate sets of numbers of transmissions, an activated number of transmissions or a combination of activated numbers of transmissions configured for one PUCCH resource set or one PUCCH format.

The activated number of transmissions is an activated number of transmissions supporting the joint and repeated transmission on the PUCCH to the plurality of TRPs of the base station, or the combination of activated numbers of transmissions is a combination of activated numbers of transmissions supporting the joint and repeated transmission on the PUCCH to the plurality of TRPs of the base station.

Further, in another possible implementation of the present disclosure, the above-mentioned activated number of transmissions or combination of activated numbers of transmissions configured for the one PUCCH resource set or the one PUCCH format is configured for the joint and repeated transmission on the PUCCH to the plurality of TRPs of the base station of the PUCCH target resource.

Further, in another possible implementation of the present disclosure, in the above-mentioned candidate sets of numbers of transmissions, the activated number of transmissions corresponding to the PUCCH resource is a first number of transmissions, in which the activated number of transmissions of the PUCCH resource on each beam is determined based on the first number of transmissions in a preset manner.

Further, in another possible implementation of the present disclosure, the above-mentioned activated number of transmissions or combination of activated numbers of transmissions includes a plurality of second numbers of transmissions, and each second number of transmissions corresponds to a number of transmissions on a transmission occasion of the PUCCH resource mapped from one beam direction.

Further, in another possible implementation of the present disclosure, there are a plurality of PUCCH target resources, and the indication signaling is a RRC signaling.

When the plurality of PUCCH target resources have a same transmission format, the RRC signaling includes a third number of transmissions, in which the third number of transmissions is configured to indicate a number of transmissions of the plurality of PUCCH target resources.

Further, in another possible implementation of the present disclosure, when the plurality of PUCCH target resources have different transmission formats, the RRC signaling includes a plurality of fourth numbers of transmissions corresponding respectively to the plurality of PUCCH target resources.

Further, in another possible implementation of the present disclosure, there are a plurality of PUCCH target resources, and the indication signaling is a RRC signaling, in which the RRC signaling includes a fifth number of transmissions configured for each PUCCH target resource in the plurality of PUCCH target resources.

Further, in another possible implementation of the present disclosure, there are a plurality of PUCCH target resources, and the above-mentioned receiving module 62 is further configured to:

obtain, from RRC configuration information of the base station, candidate sets of numbers of transmissions configured respectively for a plurality of selectable PUCCH resource sets or a plurality of PUCCH formats; and receive a MAC CE of the base station and determine, based on the MAC CE, from the candidate sets of numbers of transmissions, an activated number of transmissions or a combination of activated numbers of transmissions configured for at least one PUCCH resource set or at least one PUCCH format; in which the activated number of transmissions is an activated number of transmissions supporting the joint and repeated transmission on the PUCCH to the plurality of TRPs of the base station, or the combination of activated numbers of transmissions is a combination of activated numbers of transmissions supporting the joint and repeated transmission on the PUCCH to the plurality of TRPs of the base station.

Further, in another possible implementation of the present disclosure, the above-mentioned activated number of transmissions or combination of activated numbers of transmissions configured for the at least one PUCCH resource set or the at least one PUCCH format is configured for the joint and repeated transmission on the PUCCH to the plurality of TRPs of the base station for the plurality of PUCCH target resources.

Further, in another possible implementation of the present disclosure, in the above-mentioned candidate sets of numbers of transmissions, the activated number of transmissions corresponding to the PUCCH resource is a first number of transmissions, in which the activated number of transmissions of the PUCCH resource on each beam is determined based on the first number of transmissions in a preset manner.

Further, in another possible implementation of the present disclosure, the above-mentioned activated number of transmissions or combination of activated numbers of transmissions includes a plurality of second numbers of transmissions, and each second number of transmissions indicates a number of transmissions on a transmission occasion corresponding to one PUCCH resource.

Further, in another possible implementation of the present disclosure, there are a plurality of PUCCH target resources, and the indication signaling is a RRC signaling, in which the RRC signaling includes an association relation table between a code point of PUCCH resource information and the PUCCH target resource, and the association relation table includes a number of transmissions corresponding to a PUCCH repetition or to the PUCCH target resource.

Further, in another possible implementation of the present application, the above-mentioned receiving module 62 is further configured to:

receive a DCI;

determine the number of transmissions by querying the association relation table based on a field of PUCCH resource information contained in the DCI.

It should be noted that the foregoing explanations of the embodiments of the method for indicating a number of PUCCH transmissions shown in FIG. 1 to FIG. 2 are also applicable to the apparatus 60 for indicating a number of PUCCH transmissions in the embodiment, which are not repeated here.

With the apparatus for indicating a number of PUCCH transmissions provided by the embodiment of the present disclosure, a plurality of PUCCH resources indicated for the UE and supporting a joint and repeated transmission to a plurality of TRPs of a base station are determined, a PUCCH target resource is determined from the plurality of PUCCH resources, and a number of transmissions corresponding to a PUCCH transmission occasion for the joint and repeated transmission of the plurality of PUCCH target resources is determined based on the received indication signaling of the base station. Accordingly, the number of repeated transmissions of the PUCCH resource is flexibly set through the indication signaling of the base station, which improves a flexibility of resource configuration and realizes dynamic scheduling of resources.

In order to implement the above embodiments, the present disclosure further proposes a repeated transmission apparatus.

Figure 7:
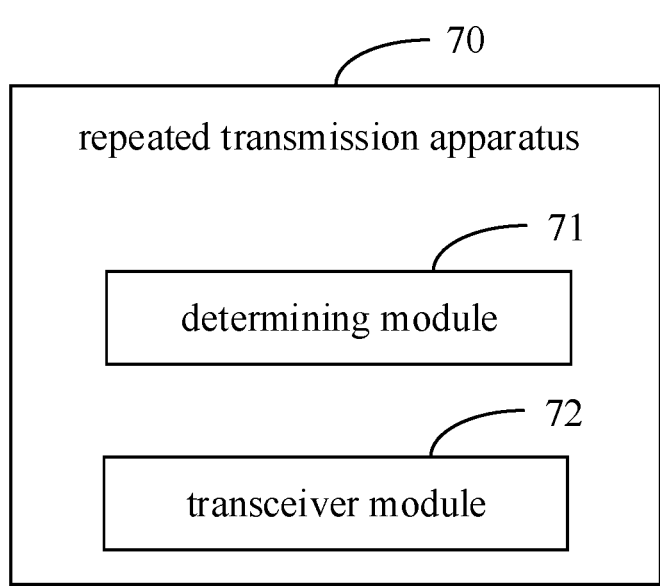
FIG. 7 is a block diagram of a repeated transmission apparatus provided by an embodiment of the present disclosure.

FIG. 7 is a block diagram of a repeated transmission apparatus provided by an embodiment of the present disclosure. The apparatus is applied to a UE.

As shown in FIG. 7, the apparatus 70 includes a determining module 71, and a transceiver module 72.

The determining module 71 is configured to determine a plurality of PUCCH resources indicated for the UE and supporting a joint and repeated transmission to a plurality of transmission and reception points (TRPs) of a base station.

The determining module 71 is further configured to determine a PUCCH target resource from the plurality of PUCCH resources.

The determining module 71 is further configured to determine a number of transmissions.

The transceiver module 72 is configured to perform a repeated transmission based on the number of transmissions, in which the number of transmissions is determined by any one of the following methods:

determining the number of transmissions according to the above-mentioned method for indicating a number of PUCCH transmissions; or determining the number of transmissions based on a protocol; or determining the number of transmissions based on a number of frequency hopping in a time slot.

It should be noted that, the foregoing explanations of the embodiment of the method for indicating a number of PUCCH transmissions shown in FIG. 3 is also applicable to the repeated transmission apparatus 70 in the embodiment, which are not repeated here.

With the apparatus for indicating a number of PUCCH transmissions provided by the embodiment of the present disclosure, a plurality of PUCCH resources indicated for the UE and supporting a joint and repeated transmission to a plurality of TRPs of a base station are determined, a PUCCH target resource is determined from the plurality of PUCCH resources, the number of transmissions is determined, and the repeated transmission is performed based on the number of transmissions. Accordingly, the number of repeated transmissions of the PUCCH resource is flexibly set through the indication signaling of the base station, which improves a flexibility of resource configuration and realizes dynamic scheduling of resources.

In order to implement the above embodiments, the present disclosure also proposes an apparatus for indicating a number of PUCCH transmissions.

Figure 8:
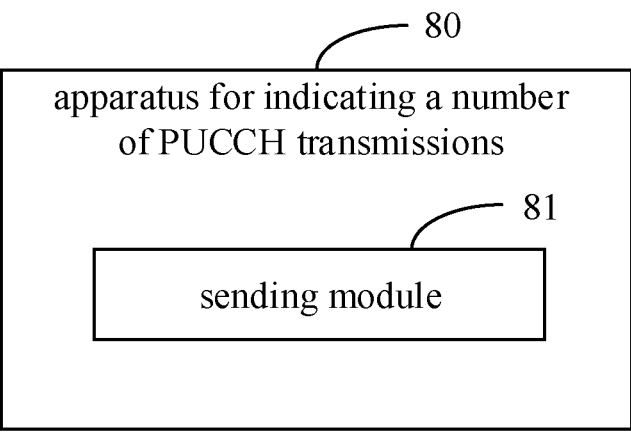
FIG. 8 is a block diagram of another apparatus for indicating a number of PUCCH transmissions provided by an embodiment of the present disclosure.

FIG. 8 is a block diagram of an apparatus for indicating a number of PUCCH transmissions provided by an embodiment of the present disclosure. The apparatus is applied to a base station.

As shown in FIG. 8, the apparatus 80 for indicating a number of PUCCH transmissions includes: a sending module 81.

The sending module 81 is configured to send an indication signaling to the UE, in which the indication signaling is configured to indicate a number of transmissions corresponding to a PUCCH transmission occasion for a joint and repeated transmission of the PUCCH target resource.

In actual use, the apparatus for indicating a number of PUCCH transmissions provided by the embodiment of the present disclosure may be configured in any base station to perform the foregoing method for indicating a number of PUCCH transmissions.

With the apparatus for indicating a number of PUCCH transmissions provided by the embodiment of the present disclosure, the base station sends an indication signaling to the UE, in which the indication signaling is configured to indicate a number of transmissions corresponding to a PUCCH transmission occasion for a joint and repeated transmission of the PUCCH target resource. Accordingly, the number of repeated transmissions of the PUCCH resource is flexibly set through the indication signaling of the base station, which improves a flexibility of resource configuration and realizes dynamic scheduling of resources.

In a possible implementation of the present disclosure, there is one PUCCH target resource, and the PUCCH target resource corresponds to at least one beam that supports the joint and repeated transmission to the plurality of TRPs of the base station, the indication signaling is a radio resource control (RRC) signaling, and the RRC signaling includes a number of transmissions configured for the PUCCH target resource.

Further, in another possible implementation of the present disclosure, the above-mentioned sending module 81 is further configured to:

send a DCI to the UE, so that the UE determines the PUCCH target resource based on a field of PUCCH resource indication information included in the DCI.

Further, in another possible implementation of the present disclosure, there is one PUCCH target resource, and the PUCCH target resource corresponds to at least one beam direction, and the above-mentioned sending module 81 is further configured to:

send RRC configuration information of the base station to the UE, in which the RRC configuration information includes candidate sets of numbers of transmissions configured respectively for a plurality of selectable PUCCH resource sets or a plurality of PUCCH formats; and send a MAC CE of the base station to the UE, and configure an activated number of transmissions or a combination of activated numbers of transmissions for one PUCCH resource set or one PUCCH format in the MAC CE based on the candidate sets of numbers of transmissions.

The activated number of transmissions is an activated number of transmissions supporting the joint and repeated transmission on the PUCCH to the plurality of TRPs of the base station, or the combination of activated numbers of transmissions is a combination of activated numbers of transmissions supporting the joint and repeated transmission on the PUCCH to the plurality of TRPs of the base station.

Further, in another possible implementation of the present disclosure, the above-mentioned activated number of transmissions or combination of activated numbers of transmissions configured for the one PUCCH resource set or the one PUCCH format is configured for the joint and repeated transmission on the PUCCH to the plurality of TRPs of the base station of the PUCCH target resource.

Further, in another possible implementation of the present disclosure, in the above-mentioned candidate sets of numbers of transmissions, the activated number of transmissions corresponding to the PUCCH resource is a first number of transmissions, in which the first number of transmissions is used to determine the activated number of transmissions of the PUCCH resource on each beam.

Further, in another possible implementation of the present disclosure, the above-mentioned activated number of transmissions or combination of activated numbers of transmissions includes a plurality of second numbers of transmissions, and each second number of transmissions corresponds to a number of transmissions on a transmission occasion of the PUCCH resource mapped from one beam direction.

Further, in another possible implementation of the present disclosure, there are a plurality of PUCCH target resources, and the indication signaling is a RRC signaling.

When the plurality of PUCCH target resources have a same transmission format, the RRC signaling includes a third number of transmissions, in which the third number of transmissions is configured to indicate a number of transmissions of the plurality of PUCCH target resources.

Further, in another possible implementation of the present disclosure, when the plurality of PUCCH target resources have different transmission formats, the RRC signaling includes a plurality of fourth numbers of transmissions corresponding respectively to the plurality of PUCCH target resources.

Further, in another possible implementation of the present disclosure, there are a plurality of PUCCH target resources, and the indication signaling is a RRC signaling, in which the RRC signaling includes a fifth number of transmissions configured for each PUCCH target resource in the plurality of PUCCH target resources.

Further, in another possible implementation of the present disclosure, there are a plurality of PUCCH target resources, and the above-mentioned sending module 81 is further configured to:

send RRC configuration information of the base station to the UE, in which the RRC configuration information includes candidate sets of numbers of transmissions configured respectively for a plurality of selectable PUCCH resource sets or a plurality of PUCCH formats;

send a MAC CE of the base station to the UE, and configure an activated number of transmissions or a combination of activated numbers of transmissions for at least one PUCCH resource set or at least one PUCCH format in the MAC CE based on the candidate sets of numbers of transmissions, in which the activated number of transmissions is an activated number of transmissions supporting the joint and repeated transmission on the PUCCH to the plurality of TRPs of the base station, or the combination of activated numbers of transmissions is a combination of activated numbers of transmissions supporting the joint and repeated transmission on the PUCCH to the plurality of TRPs of the base station.

Further, in another possible implementation of the present disclosure, the above-mentioned activated number of transmissions or combination of activated numbers of transmissions configured for the at least one PUCCH resource set or the at least one PUCCH format is configured for the joint and repeated transmission on the PUCCH to the plurality of TRPs of the base station of the plurality of PUCCH target resources.

Further, in another possible implementation of the present disclosure, in the above-mentioned candidate sets of numbers of transmissions, the activated number of transmissions corresponding to the PUCCH resource is a first number of transmissions, in which the activated number of transmissions of the PUCCH resource on each beam is determined based on the first number of transmissions in a preset manner.

Further, in another possible implementation of the present disclosure, the above-mentioned activated number of transmissions or combination of activated numbers of transmissions includes a plurality of second numbers of transmissions, and each second number of transmissions indicates a number of transmissions on a transmission occasion corresponding to one PUCCH resource.

Further, in another possible implementation of the present disclosure, there are a plurality of PUCCH target resources, and the indication signaling is a RRC signaling, in which the RRC signaling includes an association relation table between a code point of PUCCH resource information and the PUCCH target resource, in which the association relation table includes a number of transmissions corresponding to a PUCCH repeated transmission or to the PUCCH target resource.

Further, in yet another possible implementation of the present disclosure, the above-mentioned sending module 81 is further configured to:

send a DCI to the UE, in which the DCI includes a field of PUCCH resource information.

It should be noted that the foregoing explanations of the embodiments of the method for indicating a number of PUCCH transmissions shown in FIG. 4 to FIG. 5 are also applicable to the apparatus 80 for indicating a number of PUCCH transmissions in the embodiment, which are not repeated here.

With the apparatus for indicating a number of PUCCH transmissions provided by the embodiment of the present disclosure, the base station sends an indication signaling to the UE, in which the indication signaling is configured to indicate a number of transmissions corresponding to a PUCCH transmission occasion for a joint and repeated transmission of the PUCCH target resource. There are a plurality of PUCCH target resources. Accordingly, the number of repeated transmissions of the PUCCH resource is flexibly set through the indication signaling of the base station, which improves a flexibility of resource configuration and realizes dynamic scheduling of resources.

In order to realize the above embodiments, the present disclosure also proposes a UE.

The UE provided by the embodiment of the present disclosure includes a processor, a transceiver, a memory, and an executable program stored on the memory and capable of running on the processor. The processor can perform the following operations when running the executable program:

determining a plurality of PUCCH resources indicated for the UE and supporting a joint and repeated transmission to a plurality of transmission and reception points (TRPs) of a base station;

determining a PUCCH target resource from the plurality of PUCCH resources; and receiving an indication signaling of the base station and determining, based on the indication signaling, a number of transmissions corresponding to a PUCCH transmission occasion for the joint and repeated transmission of the PUCCH target resource.

The processor may include various types of storage media. The storage medium may be a non-transitory computer storage medium, which can continue to memorize information stored thereon after the user equipment is powered off.

The processor may be connected to the memory through a bus or the like, for reading the executable program stored on the memory to perform the above-mentioned method, for example, the method described in at least one of FIG. 1 to FIG. 2.

In a possible implementation of the present disclosure, there is one PUCCH target resource, and the PUCCH target resource corresponds to at least one beam that supports the joint and repeated transmission to the plurality of TRPs of the base station, and the indication signaling is a radio resource control (RRC) signaling, and the RRC signaling includes a number of transmissions configured for the PUCCH target resource.

Further, in another possible implementation of the present disclosure, determining the PUCCH target resource from the plurality of PUCCH resources includes:

obtaining downlink control information (DCI);

determining the PUCCH target resource based on a field of PUCCH resource indication information contained in the DCI.

Further, in another possible implementation of the present disclosure, there is one PUCCH target resource, and the PUCCH target resource corresponds to at least one beam direction, and receiving the indication signaling of the base station and determining, based on the indication signaling, the number of transmissions corresponding to the PUCCH transmission occasion for the joint and repeated transmission of the PUCCH target resource includes obtaining, from RRC configuration information of the base station, candidate sets of numbers of transmissions configured respectively for a plurality of selectable PUCCH resource sets or a plurality of PUCCH formats; and receiving a medium access control control element (MAC CE) of the base station and determining, based on the MAC CE, from the candidate sets of numbers of transmissions, an activated number of transmissions or a combination of activated numbers of transmissions configured for one PUCCH resource set or one PUCCH format.

The activated number of transmissions is an activated number of transmissions supporting the joint and repeated transmission on the PUCCH to the plurality of TRPs of the base station, or the combination of activated numbers of transmissions is a combination of activated numbers of transmissions supporting the joint and repeated transmission on the PUCCH to the plurality of TRPs of the base station.

Further, in yet another possible implementation of the present disclosure, the activated number of transmissions or the combination of activated numbers of transmissions configured for the one PUCCH resource set or the one PUCCH format is configured for the joint and repeated transmission on the PUCCH to the plurality of TRPs of the base station of the PUCCH target resource.

Further, in another possible implementation of the present disclosure, in the candidate sets of numbers of transmissions, the activated number of transmissions corresponding to the PUCCH resource is a first number of transmissions, in which the activated number of transmissions of the PUCCH resource on each beam is determined based on the first number of transmissions in a preset manner.

Further, in another possible implementation of the present disclosure, the activated number of transmissions or the combination of activated numbers of transmissions includes a plurality of second numbers of transmissions, and each second number of transmissions corresponds to a number of transmissions on a transmission occasion of the PUCCH resource mapped from one beam direction.

Further, in another possible implementation of the present disclosure, there are a plurality of PUCCH target resources, and the indication signaling is a RRC signaling.

When the plurality of PUCCH target resources have a same transmission format, the RRC signaling includes a third number of transmissions, in which the third number of transmissions is configured to indicate a number of transmissions of the plurality of PUCCH target resources.

Further, in yet another possible implementation of the present disclosure, when the plurality of PUCCH target resources have different transmission formats, the RRC signaling includes a plurality of fourth numbers of transmissions corresponding respectively to the plurality of PUCCH target resources.

Further, in another possible implementation of the present disclosure, there are a plurality of PUCCH target resources, and the indication signaling is a RRC signaling, in which the RRC signaling includes a fifth number of transmissions configured for each PUCCH target resource in the plurality of PUCCH target resources.

Further, in another possible implementation of the present disclosure, there are a plurality of PUCCH target resources, and receiving the indication signaling of the base station and determining, based on the indication signaling, the number of transmissions corresponding to the PUCCH transmission occasion for the joint and repeated transmission of the PUCCH target resource includes:

obtaining, from RRC configuration information of the base station, candidate sets of numbers of transmissions configured respectively for a plurality of selectable PUCCH resource sets or a plurality of PUCCH formats; and receiving a MAC CE of the base station and determining, based on the MAC CE, from the candidate sets of numbers of transmissions, an activated number of transmissions or a combination of activated numbers of transmissions configured for at least one PUCCH resource set or at least one PUCCH format; in which the activated number of transmissions is an activated number of transmissions supporting the joint and repeated transmission on the PUCCH to the plurality of TRPs of the base station, or the combination of activated numbers of transmissions is a combination of activated numbers of transmissions supporting the joint and repeated transmission on the PUCCH to the plurality of TRPs of the base station.

Further, in another possible implementation of the present disclosure, the activated number of transmissions or the combination of activated numbers of transmissions configured for the at least one PUCCH resource set or the at least one PUCCH format is configured for the joint and repeated transmission on the PUCCH to the plurality of TRPs of the base station for the plurality of PUCCH target resources.

Further, in another possible implementation of the present disclosure, in the candidate sets of numbers of transmissions, the activated number of transmissions corresponding to the PUCCH resource is a first number of transmissions, in which the activated number of transmissions of the PUCCH resource on each beam is determined based on the first number of transmissions in a preset manner.

Further, in another possible implementation of the present disclosure, the activated number of transmissions or the combination of activated numbers of transmissions includes a plurality of second numbers of transmissions, and each second number of transmissions indicates a number of transmissions on a transmission occasion corresponding to one PUCCH resource.

Further, in another possible implementation of the present disclosure, there are a plurality of PUCCH target resources, and the indication signaling is a RRC signaling, in which the RRC signaling includes an association relation table between a code point of PUCCH resource information and the PUCCH target resource, and the association relation table includes a number of transmissions corresponding to a PUCCH repetition or to the PUCCH target resource.

Further, in another possible implementation of the present disclosure, receiving the indication signaling of the base station and determining, based on the indication signaling, the number of transmissions corresponding to the PUCCH transmission occasion for the joint and repeated transmission of the PUCCH target resource includes:

receiving a DCI;

determining the number of transmissions by querying the association relation table based on a field of PUCCH resource information contained in the DCI.

In order to realize the above embodiments, the present disclosure also proposes a UE.

The UE provided by the embodiment of the present disclosure includes a processor, a transceiver, a memory, and an executable program stored on the memory and capable of running on the processor. The processor can perform the following operations when running the executable program:

determining a plurality of PUCCH resources indicated for the UE and supporting a joint and repeated transmission to a plurality of transmission and reception points (TRPs) of a base station;

determining a PUCCH target resource from the plurality of PUCCH resources;

determine a number of transmission;

performing a repeated transmission based on the number of transmissions; in which the number of transmissions is determined by any one of the following methods:

determining the number of transmissions according to the above-mentioned method for indicating a number of PUCCH transmissions; or determining the number of transmissions based on a protocol; or determining the number of transmissions based on a number of frequency hopping in a time slot.

The processor may include various types of storage media. The storage medium can be a non-transitory computer storage medium, which can continue to memorize information stored thereon after the user equipment is powered off.

The processor may be connected to the memory through a bus or the like, for reading the executable program stored on the memory to perform the above-mentioned method, for example, the method described in at least one of FIG. 1 to FIG. 3.

In order to realize the above embodiments, the present application also proposes a base station.

The base station provided by the embodiment of the present application includes a processor, a transceiver, a memory, and an executable program stored on the memory and capable of running on the processor. The processor can perform the following operations when running the executable program:

sending an indication signaling to the UE, in which the indication signaling is configured to indicate a number of transmissions corresponding to a PUCCH transmission occasion for a joint and repeated transmission of the PUCCH target resource.

The processor may include various types of storage media. The storage medium can be a non-transitory computer storage medium, which can continue to memorize information stored thereon after the user equipment is powered off.

The processor may be connected to the memory through a bus or the like, and is used to read the executable program stored in the memory to perform the above-mentioned method, for example, the method described in at least one of FIG. 4 to FIG. 5.

In a possible implementation of the present disclosure, there is one PUCCH target resource, and the PUCCH target resource corresponds to at least one beam that supports the joint and repeated transmission to the plurality of TRPs of the base station, the indication signaling is a radio resource control (RRC) signaling, and the RRC signaling includes a number of transmissions configured for the PUCCH target resource.

Further, in another possible implementation of the present disclosure, before sending the indication signaling to the UE, the following operation is further included:

sending a DCI to the UE, so that the UE determines the PUCCH target resource based on a field of PUCCH resource indication information included in the DCI.

Further, in another possible implementation of the present disclosure, there is one PUCCH target resource, and the PUCCH target resource corresponds to at least one beam direction, and sending the indication signaling to the UE includes:

sending RRC configuration information of the base station to the UE, in which the RRC configuration information includes candidate sets of numbers of transmissions configured respectively for a plurality of selectable PUCCH resource sets or a plurality of PUCCH formats; and sending a MAC CE of the base station to the UE, and configuring an activated number of transmissions or a combination of activated numbers of transmissions for one PUCCH resource set or one PUCCH format in the MAC CE based on the candidate sets of numbers of transmissions.

The activated number of transmissions is an activated number of transmissions supporting the joint and repeated transmission on the PUCCH to the plurality of TRPs of the base station, or the combination of activated numbers of transmissions is a combination of activated numbers of transmissions supporting the joint and repeated transmission on the PUCCH to the plurality of TRPs of the base station.

Further, in yet another possible implementation of the present disclosure, the activated number of transmissions or the combination of activated numbers of transmissions configured for the one PUCCH resource set or the one PUCCH format is configured for the joint and repeated transmission on the PUCCH to the plurality of TRPs of the base station of the PUCCH target resource.

Further, in another possible implementation of the present disclosure, in the candidate sets of numbers of transmissions, the activated number of transmissions corresponding to the PUCCH resource is a first number of transmissions, in which the first number of transmissions is used to determine the activated number of transmissions of the PUCCH resource on each beam.

Further, in another possible implementation of the present disclosure, the activated number of transmissions or the combination of activated numbers of transmissions includes a plurality of second numbers of transmissions, and each second number of transmissions corresponds to a number of transmissions on a transmission occasion of the PUCCH resource mapped from one beam direction.

Further, in another possible implementation of the present disclosure, there are plurality of PUCCH target resources, and the indication signaling is a RRC signaling.

When the plurality of PUCCH target resources have a same transmission format, the RRC signaling includes a third number of transmissions, in which the third number of transmissions is configured to indicate a number of transmissions of the plurality of PUCCH target resources.

Further, in yet another possible implementation of the present disclosure, when the plurality of PUCCH target resources have different transmission formats, the RRC signaling includes a plurality of fourth numbers of transmissions corresponding respectively to the plurality of PUCCH target resources.

Further, in another possible implementation of the present disclosure, there are a plurality of PUCCH target resources, and the indication signaling is a RRC signaling, in which the RRC signaling includes a fifth number of transmissions configured for each PUCCH target resource in the plurality of PUCCH target resources.

Further, in another possible implementation of the present disclosure, there are a plurality of PUCCH target resources, and sending the indication signaling to the UE includes:

sending RRC configuration information of the base station to the UE, in which the RRC configuration information includes candidate sets of numbers of transmissions configured respectively for a plurality of selectable PUCCH resource sets or a plurality of PUCCH formats;

sending a MAC CE of the base station to the UE, and configuring an activated number of transmissions or a combination of activated numbers of transmissions for at least one PUCCH resource set or at least one PUCCH format in the MAC CE based on the candidate sets of numbers of transmissions, in which the activated number of transmissions is an activated number of transmissions supporting the joint and repeated transmission on the PUCCH to the plurality of TRPs of the base station, or the combination of activated numbers of transmissions is a combination of activated numbers of transmissions supporting the joint and repeated transmission on the PUCCH to the plurality of TRPs of the base station.

Further, in another possible implementation of the present disclosure, the activated number of transmissions or combination of activated numbers of transmissions configured for the at least one PUCCH resource set or the at least one PUCCH format is configured for the joint and repeated transmission on the PUCCH to the plurality of TRPs of the base station of the plurality of PUCCH target resources.

Further, in another possible implementation of the present disclosure, in the candidate sets of numbers of transmissions, the activated number of transmissions corresponding to the PUCCH resource is a first number of transmissions, in which the activated number of transmissions of the PUCCH resource on each beam is determined based on the first number of transmissions in a preset manner.

Further, in another possible implementation of the present disclosure, the activated number of transmissions or the combination of activated numbers of transmissions includes a plurality of second numbers of transmissions, and each second number of transmissions indicates a number of transmissions on a transmission occasion corresponding to one PUCCH resource.

Further, in another possible implementation of the present disclosure, there are a plurality of PUCCH target resources, and the indication signaling is a RRC signaling, in which the RRC signaling includes an association relation table between a code point of PUCCH resource information and the PUCCH target resource, in which the association relation table includes a number of transmissions corresponding to a PUCCH repeated transmission or to the PUCCH target resource.

Further, in yet another possible implementation of the present disclosure, sending the indication signaling to the UE includes:

sending a DCI to the UE, in which the DCI includes a field of PUCCH resource information.

In order to implement the above embodiments, the present disclosure also proposes a system for indicating a number of PUCCH transmissions, including a UE and a base station.

The UE device includes: a transceiver; a memory; a processor, respectively connected to the transceiver and the memory, and configured to control the transceiver to send and receive wireless signals and perform the following operations by executing computer-executable instructions on the memory:

determining a plurality of PUCCH resources indicated for the UE and supporting a joint and repeated transmission to a plurality of transmission and reception points (TRPs) of a base station;

determining a PUCCH target resource from the plurality of PUCCH resources; and receiving an indication signaling of the base station and determining, based on the indication signaling, a number of transmissions corresponding to a PUCCH transmission occasion for the joint and repeated transmission of the PUCCH target resource.

The base station includes: a transceiver; a memory; a processor, respectively connected to the transceiver and the memory, and configured to control the transceiver to send and receive wireless signals and perform the following operations by executing computer-executable instructions on the memory:

sending an indication signaling to the UE, in which the indication signaling is configured to indicate the number of transmissions corresponding to the transmission occasion for the joint and repeated transmission of the PUCCH target resource.

In order to implement the above embodiments, the present disclosure also proposes a computer storage medium.

The computer storage medium provided by the embodiment of the present disclosure stores an executable program; after the executable program is executed by a processor, the method for indicating a number of PUCCH transmissions or the repeated transmission method provided by any of the foregoing technical solutions can be implemented, for example, as shown in at least one of FIGS. 1 to 5.

In order to implement the above embodiments, the present disclosure also proposes a computer program product, including a computer program. When the computer program is executed by a processor, the method for indicating a number of PUCCH transmissions or the repeated transmission method as described above can be implemented.

In order to implement the above embodiments, the present disclosure further provides a computer program, which, when executed by a processor, implements the method for indicating a number of PUCCH transmissions or the repeated transmission method described in the embodiments of the present disclosure.

Figure 9:
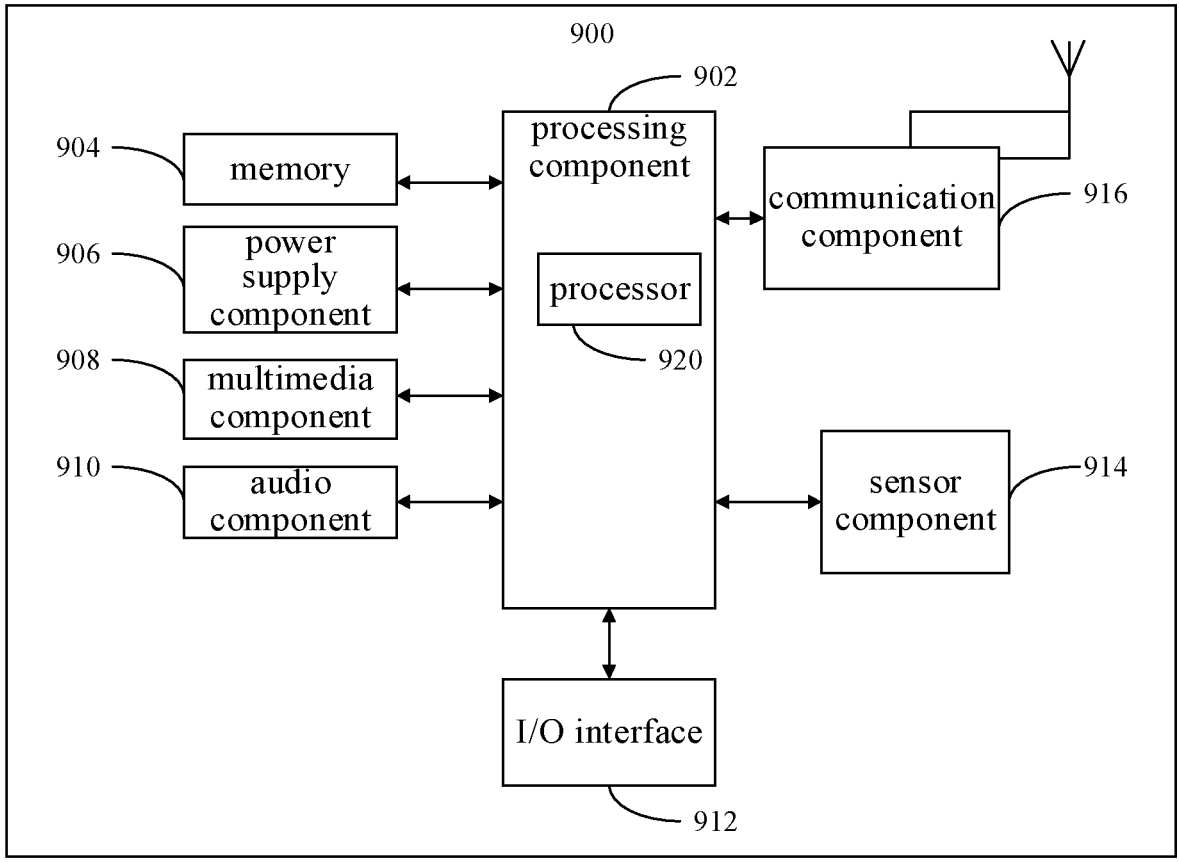
FIG. 9 is a block diagram of a UE provided by an embodiment of the present disclosure.

FIG. 9 is a block diagram of a user equipment (UE) 900 provided by an embodiment of the present disclosure. For example, the UE 900 may be a mobile phone, a computer, a digital broadcast user equipment, a messaging device, a game console, a tablet device, a medical device, a fitness device, a personal digital assistant, and the like.

With reference to FIG. 9, the UE 900 may include at least one of the following components: a processing component 902, a memory 904, a power supply component 906, a multimedia component 908, an audio component 910, an input/output (I/O) interface 912, a sensor component 914, and a communication component 916.

The processing component 902 generally controls the whole operation of the UE 900, such as the operations related to display, phone call, data communication, camera operation and recording operation. The processing component 902 may include one or more processors 920 to perform instructions, to complete all or part of steps of the above method. In addition, the processing component 902 may include one or more modules for the convenience of interaction between the processing component 902 and other components. For example, the processing component 902 may include a multimedia module for the convenience of interaction between the multimedia component 908 and the processing component 902.

The memory 904 is configured to store all types of data to support the operation of the UE 900. Examples of the data include the instructions of any applications or methods operated on the UE 900, contact data, phone book data, messages, pictures, videos, etc. The memory 904 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 906 may provide power for all components of the UE 900. The power supply component 906 may include power supply management system, one or more power supplies, and other units related to generating, managing and distributing power for the UE 900.

The multimedia component 908 includes a display screen of an output interface provided between the UE 900 and the user. In some embodiments, the screen may include a liquid crystal display (LCD) and a touch panel (TP). If the screen includes a touch panel, the screen may be implemented as a touch screen to receive input signals from a user. The touch panel includes one or more touch sensors to sense touch, swipe, and gestures on the touch panel. The touch sensor may not only sense the boundaries of a touch or swipe action, but also detect the duration and pressure associated with the touch or swipe action. In some embodiments, the multimedia component 908 includes a front camera and/or a rear camera. When the UE 900 is in operation mode, such as shooting mode or video mode, the front camera or the rear camera may receive the external multimedia data. Each front camera and rear camera may be a fixed optical lens system or an optical lens system with a focal length and an optical zoom capacity.

The audio component 910 is configured as output and/or input signal. For example, the audio component 910 includes a microphone (MIC). When the UE 900 is in operation mode, such as call mode, record mode, and speech recognition mode, the microphone is configured to receive the external audio signals. The audio signals received may be further stored in the memory 904 or sent via the communication component 916. In some embodiments, the audio component 910 further includes a speaker configured to output an audio signal.

The I/O interface 912 provides an interface for the processing component 902 and the peripheral interface module, and the peripheral interface module may be a keyboard, a click wheel, a button, etc. The buttons may include but not limited to a home button, a volume button, a start button and a lock button.

The sensor component 914 includes one or more sensors, configured to provide various aspects of status assessment for the UE 900. For example, the sensor component 914 may detect the on/off state of the UE 900 and the relative positioning of the component. For example, the component is a display and a keypad of the UE 900. The sensor component 914 may further detect the location change of the UE 900 or one component of the UE 900, the presence or absence of contact between the user and the UE 900, the orientation or acceleration/deceleration of the UE 900, and the temperature change of the UE 900. The sensor component 914 may include a proximity sensor, which is configured to detect the existence of the objects nearby without any physical contact. The sensor component 914 may further include a light sensor such as CMOS or CCD image sensor, which is configured to use in imaging applications. In some embodiments, the sensor component 914 may further include an acceleration transducer, a gyroscope sensor, a magnetic sensor, a pressure sensor or a temperature sensor.

The communication component 916 is configured for the convenience of wire or wireless communication between the UE 900 and other devices. The UE 900 may access wireless networks based on a communication standard, such as Wi-Fi, 2G, or 3G, or their combination. In an exemplary embodiment, the communication component 916 receives broadcast signals or broadcast-related information from an external broadcast management system via a broadcast channel. In an exemplary embodiment, the communication component 916 further includes a near field communication (NFC) module to facilitate short-range communication. For example, an NFC module may be implemented based on a radio frequency identification (RFID) technology, an infrared data association (IRDA) technology, an ultra-wideband (UWB) technology, Bluetooth (BT) technology and other technologies.

In an embodiment, the UE 900 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above method.

In an exemplary embodiment, a non-transitory computer-readable storage medium is further provided which includes instructions, such as the memory 904 including instructions, in which the instructions may be executed by the processor 920 of the UE 900 to complete the above method. For example, the non-transitory computer-readable storage medium may be a ROM, a random access memory (RAM), a CD-ROM, a magnetic tape, a floppy disk, an optical data storage device, etc.

Figure 10:
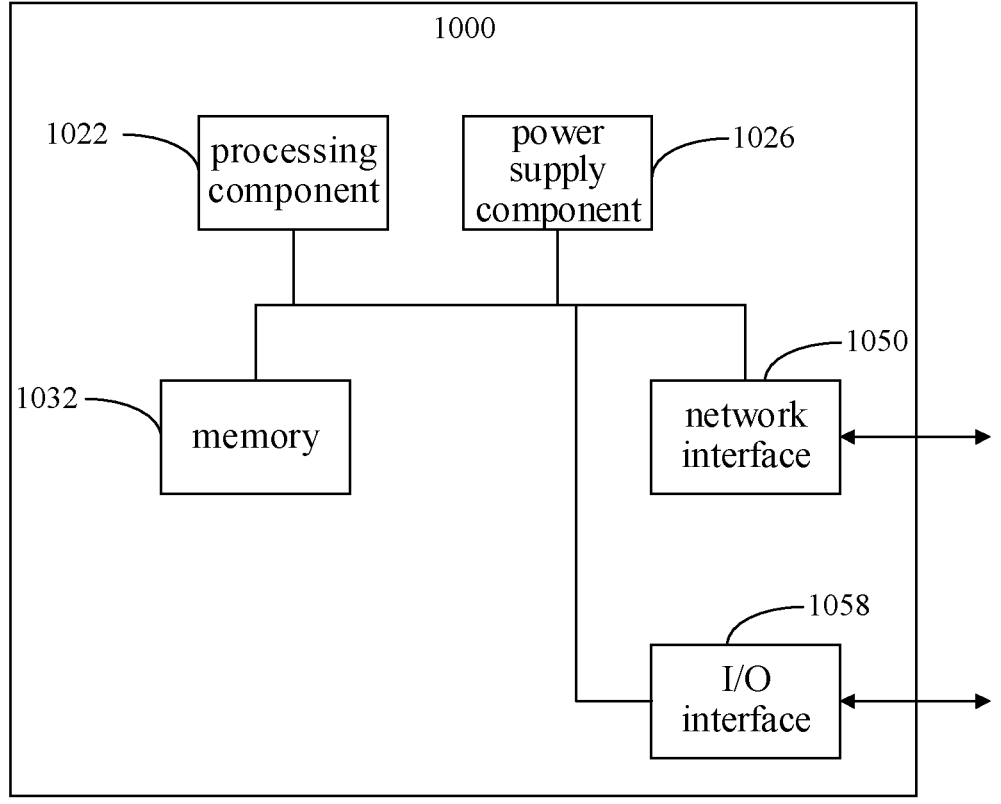
FIG. 10 is a block diagram of a base station provided by an embodiment of the present disclosure.

FIG. 10 is a block diagram of a base station according to an embodiment. For example, the base station 1000 may be provided as a base station. As illustrated in FIG. 10, the base station 1000 includes a processing component 1022, which includes one or more processors, and a memory resource represented by a memory 1032 for storing instructions executable by the processing component 1022, such as application programs. The application program stored in the memory 1032 may include one or more modules, each module corresponds to a set of instructions. In addition, the processing component 1022 is configured to execute instructions to perform the method described above and applied to the base station, such as the method described in FIG. 6.

The base station 1000 may also include a power supply component 1026 configured to perform power management of the base station 1000, a wired or wireless network interface 1050 configured to connect the base station 1000 to the network, and an I/O interface 1058. The base station 1000 may operate based on an operating system stored on the memory 1032, such as Windows Server™, Mac OS X™, Unix™, Linux™, FreeBSD™ or the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for indicating a number of physical uplink control channel (PUCCH) transmissions, performed by a user equipment (UE), comprising:

determining a plurality of PUCCH resources indicated for the UE, wherein the plurality of PUCCH resources support a joint and repeated transmission to a plurality of transmission and reception points (TRPs) of a base station;

determining a first PUCCH resource from the plurality of PUCCH resources;

receiving an indication signaling from the base station; and determining, based on the indication signaling, a number of transmissions corresponding to a PUCCH transmission occasion for the joint and repeated transmission of the first PUCCH resource;

wherein receiving the indication signaling from the base station and determining, based on the indication signaling, the number of transmissions corresponding to the PUCCH transmission occasion for the joint and repeated transmission of the first PUCCH resource comprises:

obtaining, from radio resource control (RRC) configuration information of the base station, candidate sets of numbers of transmissions configured respectively for a plurality of selectable PUCCH resource sets or a plurality of PUCCH formats: and receiving a medium access control control element (MAC CE) from the base station and determining, based on the MAC CE from the candidate sets, an activated number of transmissions or a combination of activated numbers of transmissions configured for one PUCCH resource set or one PUCCH format;

wherein the activated number of transmissions is an activated number of transmissions supporting the joint and repeated transmission, or the combination of activated numbers of transmissions is a combination of activated numbers of transmissions supporting the joint and repeated transmission.

2. The method of claim 1, wherein determining the first PUCCH resource from the plurality of PUCCH resources comprises:

obtaining downlink control information (DCI);

determining the first PUCCH resource based on a field of PUCCH resource indication information contained in the DCI.

3. The method of claim 1, wherein the activated number of transmissions or the combination of activated numbers of transmissions configured for the one PUCCH resource set or the one PUCCH format is configured for the joint and repeated transmission of the first PUCCH resource.

4. The method of claim 1, wherein the activated number of transmissions or the combination of activated numbers of transmissions comprises a plurality of second numbers of transmissions, and each second number of transmissions corresponds to a number of transmissions on a transmission occasion of the PUCCH resource mapped from one beam direction.

5. A non-transitory computer storage medium, wherein the computer storage medium stores computer-executable instructions; after the computer-executable instructions are executed by a processor, the method according to claim 1 is implemented.

6. A method for indicating a number of physical uplink control channel (PUCCH) transmissions, performed by a base station, comprising:

sending an indication signaling to a user equipment (UE), wherein the indication signaling is configured to indicate a number of transmissions corresponding to a PUCCH transmission occasion for a joint and repeated transmission of a first PUCCH resource;

wherein sending the indication signaling to the UE comprises:

sending radio resource control (RRC) configuration information to the UE, wherein the RRC configuration information comprises candidate sets of numbers of transmissions configured respectively for a plurality of selectable PUCCH resource sets or a plurality of PUCCH formats; and sending a medium access control control element (MAC CE) to the UE, and configuring an activated number of transmissions or a combination of activated numbers of transmissions for one PUCCH resource set or one PUCCH format in the MAC CE based on the candidate sets;

wherein the activated number of transmissions is an activated number of transmissions supporting the joint and repeated transmission, or the combination of activated numbers of transmissions is a combination of activated numbers of transmissions supporting the joint and repeated transmission.

7. The method of claim 6, wherein there is one first PUCCH resource, and the first PUCCH resource corresponds to at least one beam supporting the joint and repeated transmission to a plurality of transmission and reception points (TRPs) of the base station, the indication signaling is a radio resource control (RRC) signaling, and the RRC signaling includes a number of transmissions corresponding to the first PUCCH resource.

8. The method of claim 6, wherein before sending the indication signaling to the UE, the method further comprises:

sending downlink control information (DCI) to the UE, wherein the DCI is used for determination of the first PUCCH resource based on a field of PUCCH resource indication information contained in the DCI.

9. The method of claim 6, wherein the activated number of transmissions or the combination of activated numbers of transmissions configured for the one PUCCH resource set or the one PUCCH format is configured for the joint and repeated transmission of the first PUCCH resource.

10. The method of claim 6, wherein the activated number of transmissions or the combination of activated numbers of transmissions comprises a plurality of second numbers of transmissions, and each second number of transmissions corresponds to a number of transmissions on a transmission occasion of the PUCCH resource mapped from one beam direction.

11. A base station, comprising: a transceiver; a memory; and a processor, respectively connected to the transceiver and the memory, and configured to perform the method according to claim 6.

12. A non-transitory computer storage medium, wherein the computer storage medium stores computer-executable instructions; after the computer-executable instructions are executed by a processor, the method according to claim 6 is implemented.

13. A user equipment (UE), comprising: a transceiver; a memory; and a processor, respectively connected to the transceiver and the memory, and configured to:

determine a plurality of PUCCH resources indicated for the UE, wherein the plurality of PUCCH resources support a joint and repeated transmission to a plurality of transmission and reception points (TRPs) of a base station;

determine a first PUCCH resource from the plurality of PUCCH resources; receive an indication signaling from the base station; and determine, based on the indication signaling, a number of transmissions corresponding to a PUCCH transmission occasion for the joint and repeated transmission of the first PUCCH resource; the processor is further configured to:

obtain, from radio resource control (RRC) configuration information of the base station, candidate sets of numbers of transmissions configured respectively for a plurality of selectable PUCCH resource sets or a plurality of PUCCH formats; and receive a medium access control control element (MAC CE) from the base station and determining, based on the MAC CE from the candidate sets, an activated number of transmissions or a combination of activated numbers of transmissions configured for one PUCCH resource set or one PUCCH format; wherein the activated number of transmissions is an activated number of transmissions supporting the joint and repeated transmission, or the combination of activated numbers of transmissions is a combination of activated numbers of transmissions supporting the joint and repeated transmission.

14. The user equipment of claim 13, wherein the processor is configured to:

obtain downlink control information (DCI);

determine the first PUCCH resource based on a field of PUCCH resource indication information contained in the DCI.

15. The user equipment of claim 13, wherein the activated number of transmissions or the combination of activated numbers of transmissions configured for the one PUCCH resource set or the one PUCCH format is configured for the joint and repeated transmission of the first PUCCH resource.

\* \* \* \* \*